United States Patent
Wu et al.

(10) Patent No.: US 11,604,479 B2
(45) Date of Patent: Mar. 14, 2023

(54) METHODS AND SYSTEM FOR VISION-BASED LANDING

(71) Applicant: SZ DJI TECHNOLOGY CO., LTD., Shenzhen (CN)

(72) Inventors: Bo Wu, Shenzhen (CN); Ang Liu, Shenzhen (CN); Litian Zhang, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 321 days.

(21) Appl. No.: 16/365,062

(22) Filed: Mar. 26, 2019

(65) Prior Publication Data
US 2019/0220039 A1  Jul. 18, 2019

Related U.S. Application Data

(63) Continuation of application No. PCT/CN2016/100190, filed on Sep. 26, 2016.

(51) Int. Cl.
| | |
|---|---|
| *G05D 1/06* | (2006.01) |
| *B64C 39/02* | (2006.01) |
| *B64D 47/08* | (2006.01) |

(52) U.S. Cl.
CPC ......... *G05D 1/0676* (2013.01); *B64C 39/024* (2013.01); *B64D 47/08* (2013.01); *B64C 2201/141* (2013.01)

(58) Field of Classification Search
CPC .. G05D 1/0676; G05D 1/0653; G05D 1/0607; G05D 1/04; G05D 1/06; G05D 1/0202; G05D 1/0808; G05D 3/20; B64C 39/02; B64C 39/024; B64C 2201/027; B64C 2201/021; B64C 2201/024;
(Continued)

(56) References Cited

U.S. PATENT DOCUMENTS 7,725,257 B2 * 5/2010 Strelow ................. G05D 1/101
                                                          701/448
9,817,396 B1 * 11/2017 Takayama .......... G06K 9/00637
(Continued)

FOREIGN PATENT DOCUMENTS

| CN | 101000243 A | 7/2007 |
|---|---|---|
| CN | 101349565 A | 1/2009 |

(Continued)

OTHER PUBLICATIONS

The World Intellectual Property Organization(WIPO) International Search Report and Written Opinion for PCT/CN2016/100190 dated Jun. 16, 2017 9 pages.

*Primary Examiner* — Russell Frejd
*Assistant Examiner* — Brandon Z Willis
(74) *Attorney, Agent, or Firm* — Anova Law Group, PLLC

(57) ABSTRACT

A computer-implemented method for controlling an unmanned aerial vehicle (UAV) includes obtaining a first image captured by an imaging device carried by the UAV during a takeoff of the UAV from a target location, obtaining a second image from the imaging device in response to an indication to return to the target location, determining a spatial relationship between the UAV and the target location by comparing the first image and the second image, and controlling the UAV to approach the target location based at least in part on the spatial relationship.

19 Claims, 13 Drawing Sheets

(58) Field of Classification Search
CPC ........ B64C 2201/088; B64C 2201/086; B64C 2201/108; B64C 2201/123; B64C 2201/127; B64C 2201/141; B64C 2201/145; B64C 2201/187; B64D 47/08; B64D 47/00
See application file for complete search history.

(56) References Cited

U.S. PATENT DOCUMENTS

| | | | |
|---|---|---|---|
| 10,636,150 B2* | 4/2020 | Omari | G06K 9/78 |
| 2009/0306840 A1 | 12/2009 | Blenkhorn et al. | |
| 2012/0200703 A1* | 8/2012 | Nadir | H04N 5/232 348/144 |
| 2014/0212027 A1* | 7/2014 | Hallquist | G06F 3/1415 382/154 |
| 2017/0090271 A1* | 3/2017 | Harris | G06K 9/46 |
| 2017/0129603 A1* | 5/2017 | Raptopoulos | G08G 5/0069 |
| 2017/0152059 A1* | 6/2017 | Peng | B64C 39/024 |
| 2018/0032040 A1* | 2/2018 | Sweet, III | G05D 1/102 |
| 2018/0051987 A1* | 2/2018 | Livens | G01C 11/02 |
| 2018/0204331 A1* | 7/2018 | Omari | G01S 13/878 |
| 2019/0031346 A1* | 1/2019 | Yong | A01M 7/0042 |

FOREIGN PATENT DOCUMENTS

| | | |
|---|---|---|
| CN | 101504287 A | 8/2009 |
| CN | 101509782 A | 8/2009 |
| CN | 102756808 A | 10/2012 |
| CN | 102768042 A | 11/2012 |
| CN | 102788579 A | 11/2012 |
| CN | 103175524 A | 6/2013 |
| CN | 103803092 A | 5/2014 |
| CN | 103822635 A | 5/2014 |
| CN | 104656669 A | 5/2015 |
| CN | 104679013 A | 6/2015 |
| CN | 104932515 A | 9/2015 |
| CN | 105045276 A | 11/2015 |
| CN | 105068553 A | 11/2015 |
| CN | 105527973 A | 4/2016 |
| CN | 205507547 U | 8/2016 |
| JP | 5656316 B1 | 1/2015 |
| KR | 100842104 B1 | 6/2008 |

* cited by examiner

METHODS AND SYSTEM FOR VISION-BASED LANDING

CROSS-REFERENCE TO RELATED APPLICATION

This application is a continuation of international Application No. PCT/CN2016/100190, filed on Sep. 26, 2016, the entire content of which is incorporated herein by reference.

BACKGROUND OF THE DISCLOSURE

Modern unmanned aerial vehicles (UAVs) are used to perform a variety of tasks such as navigation, surveillance and tracking, remote sensing, search and rescue, scientific research, and the like. Autonomous and precise landing of the UAVs is often an important part of achieving such tasks. Existing technologies, however, fail to provide precise and reliable landing solutions.

SUMMARY OF THE DISCLOSURE

According to embodiments, a computer-implemented method is provided for controlling an unmanned aerial vehicle (UAV). The method comprises obtaining a plurality of reference images captured by an imaging device carried by the UAV, each reference image of the plurality of reference images associated with metadata indicating a reference spatial relationship between the UAV and a predetermined location at the time the reference image is captured; obtaining a current image captured by the imaging device; determining a current spatial relationship between the UAV and the predetermined location by comparing the current image with the plurality of reference images; and controlling the UAV to approach the predetermined location based at least in part on the current spatial relationship between the UAV and the predetermined location.

According to embodiments, an unmanned aerial vehicle (UAV) is provided. The UAV comprises a memory that stores one or more computer-executable instructions; and one or more processors configured to access the memory and execute the computer-executable instructions to perform steps comprising obtaining a plurality of reference images captured by an imaging device carried by the UAV, each reference image of the plurality of reference images associated with metadata indicating a reference spatial relationship between the UAV and a predetermined location at the time the reference image is captured; obtaining a current image captured by the imaging device; determining a current spatial relationship between the UAV and the predetermined location by comparing the current image with the plurality of reference images; and controlling the UAV to approach the predetermined location based at least in part on the current spatial relationship between the UAV and the predetermined location.

According to embodiments, a computer system is provided. The computer system comprises a memory that stores one or more computer-executable instructions; and one or more processors configured to access the memory and execute the computer-executable instructions to perform steps comprising obtaining a plurality of reference images captured by an imaging device carried by an unmanned aerial vehicle (UAV), each reference image of the plurality of reference images associated with metadata indicating a reference spatial relationship between the UAV and a predetermined location at the time the reference image is captured; obtaining a current image captured by the imaging device; determining a current spatial relationship between the UAV and the predetermined location by comparing the current image with the plurality of reference images; and controlling the UAV to approach the predetermined location based at least in part on the current spatial relationship between the UAV and the predetermined location.

According to embodiments, one or more non-transitory computer-readable storage media is provided for storing computer-executable instructions that, when executed by a computing system, configure the computing system to perform operations comprising obtaining a plurality of reference images captured by an imaging device carried by an unmanned aerial vehicle (UAV), each reference image of the plurality of reference images associated with metadata indicating a reference spatial relationship between the UAV and a predetermined location at the time the reference image is captured; obtaining a current image captured by the imaging device; determining a current spatial relationship between the UAV and the predetermined location by comparing the current image with the plurality of reference images; and controlling the UAV to approach the predetermined location based at least in part on the current spatial relationship between the UAV and the predetermined location.

In some embodiments, the imaging device is carried by the UAV via a carrier that allows the imaging device to move relative to the UAV.

In some embodiments, the plurality of reference images is obtained when the UAV is within a predetermined range from the predetermined location.

In some embodiments, obtaining the plurality of reference images comprises obtaining a first reference image at a first UAV position; and obtaining a second reference image at a second UAV position in response to determining that a distance between the first UAV position and the second UAV position exceeds a predetermined threshold.

In some embodiments, the metadata associated with each reference image comprises at least one of a position of the UAV, an orientation of the UAV, an orientation of the imaging device, and a timestamp.

In some embodiments, the metadata associated with each reference image comprises at least two of a position of the UAV, an orientation of the UAV, and an orientation of the imaging device.

In some embodiments, the metadata is generated based at least in part on a measurement from a position sensor and the current spatial relationship is determined without obtaining a measurement from the position sensor.

In some embodiments, the current image is obtained in response to an indication to land the UAV at the predetermined location.

In some embodiments, the current image is obtained in response to an indication to land the UAV at the predetermined location.

In some embodiments, determining the current spatial relationship comprises selecting a subset of the plurality of reference images based at least n part on a current state of the UAV or the imaging device at the time the current image is captured and comparing the current image with the subset of the plurality of reference images to determine the current spatial relationship.

In some embodiments, determining the current spatial relationship comprises selecting a matching reference image from the plurality of reference images based on the comparison between the current image and the plurality of reference images; determining a transformation between the current image and the matching reference image; and determining the current spatial relationship based at least in part on the transformation between the current image and the matching reference image.

According to embodiments, a computer-implemented method is provided for controlling an unmanned aerial vehicle (UAV). The method comprises obtaining a first image captured by an imaging device carried by the UAV during a takeoff of the UAV from a target location; in response to an indication to return to the target location, obtaining a second image from the imaging device; determining a spatial relationship between the UAV and the target location by comparing the first image and the second image; and controlling the UAV to approach the target location based at least in part on the spatial relationship.

According to embodiments, an unmanned aerial vehicle (UAV) is provided. The UAV comprises a memory that stores one or more computer-executable instructions; and one or more processors configured to access the memory and execute the computer-executable instructions to perform a method comprising obtaining a first image captured by an imaging device carried by the UAV during a takeoff of the UAV from a target location; in response to an indication to return to the target location, obtaining a second image from the imaging device; determining a spatial relationship between the UAV and the target location by comparing the first image and the second image; and controlling the UAV to approach the target location based at least in part on the spatial relationship.

According to embodiments, a computer system is provided. The computer system comprises a memory that stores one or more computer-executable instructions; and one or more processors configured to access the memory and execute the computer-executable instructions to perform a method comprising obtaining a first image captured by an imaging device carried by an unmanned aerial vehicle (UAV) during a takeoff of the UAV from a target location; in response to an indication to return to the target location, obtaining a second image from the imaging device; determining a spatial relationship between the UAV and the target location by comparing the first image and the second image; and controlling the UAV to approach the target location based at least in part on the spatial relationship.

According to embodiments, one or more non-transitory computer-readable storage media is provided for storing computer-executable instructions that, when executed by a computing system, configure the computing system to perform a method comprising obtaining a first image captured by an imaging device carried by an unmanned aerial vehicle (UAV) during a takeoff of the UAV from a target location; in response to an indication to return to the target location, obtaining a second image from the imaging device; determining a spatial relationship between the UAV and the target location by comparing the first image and the second image; and controlling the UAV to approach the target location based at least in part on the spatial relationship.

In some embodiments, the first image and the second image are obtained during a same flight of the UAV.

In some embodiments, the first image or the second image does not include the target location.

In some embodiments, the indication to return to the target location is received from a remote device.

In some embodiments, the indication to return to the target location is generated by one or more processors onboard the UAV.

In some embodiments, the first image is captured at first pose and the second image is captured at a second pose, and determining the spatial relationship between the UAV and the target location comprises determining a transformation between the first pose and the second pose based on the comparison between the first image and the second image; and determining the second pose based at least in part on the first pose and the transformation.

In some embodiments, the first pose comprises a position or an orientation of the UAV when the first image is captured.

In some embodiments, the first pose comprises a position or an orientation of the imaging device when the first image is captured.

In some embodiments, the first pose is determined based at least in part on measurement from a position sensor and the second pose is determined without using measurement from the position sensor.

In some embodiments, the first image is captured at a first orientation of the imaging device, and the imaging device is controlled to have substantially the first orientation before the second image is captured.

According to embodiments, a computer-implemented method is provided for determining a position of an unmanned aerial vehicle (UAV). The method comprises determining a first position of the UAV based at least n part on measurement from a position sensor carried by the UAV; associating the first position of the UAV with a first image captured by an imaging device carried by the UAV when the UAV is at the first position; and determining, without using the position sensor, a second position of the UAV by comparing a second image with the first image, the second image captured by the imaging device when the UAV is at the second position.

According to embodiments, an unmanned aerial vehicle (UAV) is provided. The UAV comprises a memory that stores one or more computer-executable instructions; and one or more processors configured to access the memory and execute the computer-executable instructions to perform a method comprising determining a first position of the UAV based at least in part on measurement from a position sensor carried by the UAV; associating the first position of the UAV with a first image captured by an imaging device carried by the UAV when the UAV is at the first position; and determining, without using the position sensor, a second position of the UAV by comparing a second image with the first image, the second image captured by the imaging device when the UAV is at the second position.

According to embodiments, a computer system is provided. The computer system comprises a memory that stores one more computer-executable instructions; and one or more processors configured to access the memory and execute the computer-executable instructions to perform a method comprising determining a first position of an unmanned aerial vehicle (UAV) based at least in part on measurement from a position sensor carried by the UAV; associating the first position of the UAV with a first image captured by an imaging device carried by the UAV when the UAV is at the first position; and determining, without using the position sensor, a second position of the UAV by comparing a second image with the first image, the second image captured by the imaging device when the UAV is at the second position.

According to embodiments, one or more non-transitory computer-readable storage media. is provided for storing computer-executable instructions that, when executed by a computing system, configure the computing system to perform a method comprising determining a first position of an unmanned aerial vehicle (UAV) based at least in part on measurement from a position sensor carried by the UAV; associating the first position of the UAV with a first image captured by an imaging device carried by the UAV when the UAV is at the first position; and determining, without using the position sensor, a second position of the UAV by comparing a second image with the first image, the second image captured by the imaging device when the UAV is at the second position.

In some embodiments, the position sensor is a GPS sensor.

In some embodiments, the first image is captured by the imaging device during a takeoff of the UAV and the second image is captured by the imaging device during a landing of the UAV.

In some embodiments, the first image and the second image are captured during a same flight of the UAV.

In some embodiments, the method further comprises controlling the imaging device to capture the first image based at least in part on a determination that the UAV is within a first predetermined range from a target location.

In some embodiments, the method further comprises controlling the imaging device to capture the second image based at least in part on a determination that the UAV is within a second predetermined range from the target location.

In some embodiments, the second predetermined range is substantially larger than the first predetermined range.

In some embodiments, the UAV is determined to be within the second predetermined range based on measurement from the position sensor.

In some embodiments, the method further comprises generating local control commands for controlling the UAV to land at or near a target location based at least in part on the second position of the UAV.

In some embodiments, the method further comprises receiving, from a remote device, one or more remote control commands for controlling the UAV during the landing of the UAV; and generating combined control commands for the controlling the UAV based on the local control commands and the remote control commands.

It shall be understood that different aspects of the disclosure can be appreciated individually, collectively, or in combination with each other. Various aspects of the disclosure described herein may be applied to any of the particular applications set forth below or data communication between any other types of movable and/or stationary objects.

Other objects and features of the present disclosure will become apparent by a review of the specification, claims, and appended figures.

BRIEF DESCRIPTION OF THE DRAWINGS

The novel features of the invention are set forth with particularity in the appended claims. A better understanding of the features and advantages of the present disclosure will be obtained by reference to the following detailed description that sets forth illustrative embodiments, in which the principles of the disclosure are utilized, and the accompanying drawings of which:

DETAILED DESCRIPTION OF THE EMBODIMENTS

Existing technologies for autonomous UAV landing can be insufficient. For instance, some existing technologies have used GPS signals to guide a UAV to above a designated location before controlling the UAV to descend vertically. However, GPS sensors can be susceptible to measurement errors or drifts, affecting landing reliability. To make things worse, GPS signals may be unavailable or weak in some cases (e.g., indoor or in a city). Certain vision-based technologies rely on recognition of predefined visual markers (e.g., an H-shaped pattern) at a landing location. Such an approach, however, requires the UAV to have pre-acquired template of the markers. Furthermore, the pre-acquired template of the markers may be different from the actual appearance of the markers from the perspective of the UAV, affecting landing accuracy.

The systems, devices, and methods are provided for autonomous, precise, and reliable landing the UAV that address some or all problems discussed above. In particular, one or more processors onboard and/or offboard a UAV may be configured to obtain a plurality of reference images captured by an imaging device carried by the UAV. The reference images can be captured during a takeoff process of the UAV, as the UAV moves away from a target location (e.g., launch location). The reference images may be annotated with metadata indicating the spatial relationship between the UAV and the target location at the time the reference images are captured. Subsequently, one or more subject images can be obtained by the imaging device and compared with the reference images to determine a spatial relationship between the UAV and target location. Advantageously, relatively precise vision-based landing is provided without relying on GPS sensors. The reference images can be obtained by the UAV in real time without requiring preloading the UAV with marker templates. Furthermore, comparing subject images with reference images, which are actual images of the actual surroundings of the UAV, can improve image detection and matching, further improving landing accuracy.

Figure 1:
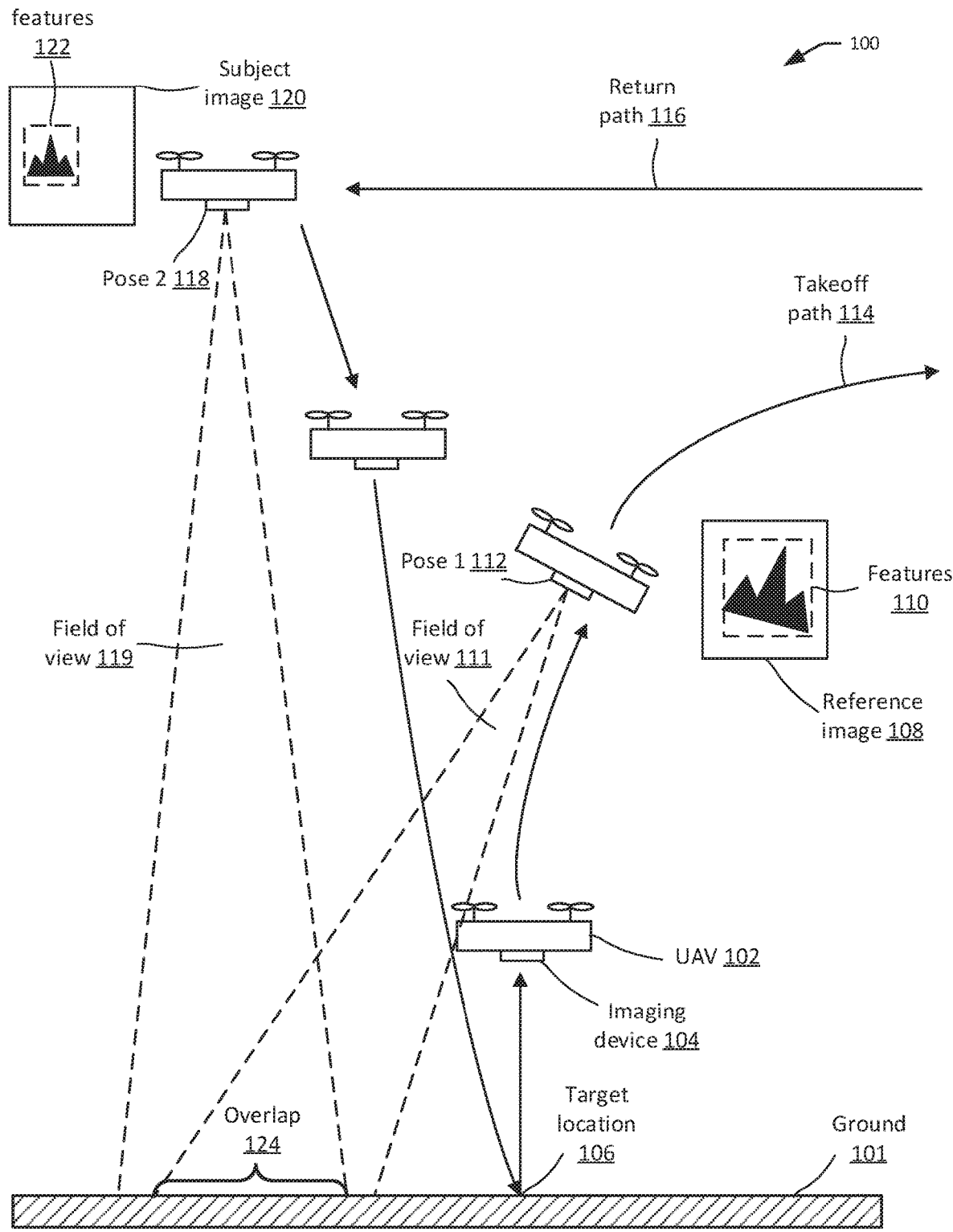
FIG. 1 illustrates an exemplary process for vision-based landing of a UAV, in accordance with embodiments

FIG. 1 illustrates an exemplary process 100 for vision-based landing of a UAV 102, in accordance with embodiments. The imaging device can be configured to capture images of the surrounding environment. Imaging device can refer to any device that includes an image sensor such as monocular camera, stereo vision camera, radar, sonar, infrared camera, light sensor, and the like. In some embodiments, the imaging device is configured with a wide-angle lens or ultra-wide angle lens (e.g., fisheye lens, rectilinear lens) to provide a wide angle of view. In the illustrated embodiment, an imaging device 104 is fixedly coupled with the UAV 102 such that the field of view of the imaging device remains fixed relative to the UAV. For example, the imagining device may point straight down (e.g., the optical axis of the imaging device is substantially parallel to vertical or yaw axis of the UAV). Alternatively, the imaging device may be forward looking (e.g., the optical axis points between the vertical axis and the longitudinal axis of the UAV), or in any other fixed orientation with respect to the UAV. When the imaging device is fixedly coupled with the UAV, the pose of the imaging device is substantially fixed relative to the pose of the UAV. In general, a pose of an object (e.g., a UAV or an imaging device) can refer to a position (e.g., X, Y, Z coordinates) and/or an orientation (e.g., pitch, roll, yaw) of the object n a given reference frame. For example, a position of the object can be expressed relative to an origin of a given coordinate system representing the reference frame. As another example, an orientation of the object can be expressed relative to the axes of the coordinate system.

The UAV 102 can be configured to takeoff from a target location 106 (e.g., a launch location) on the ground 101 or any other suitable surface. The takeoff phase of the UAV is initiated when the propulsion units of the UAV are started to take the UAV off the ground. The takeoff phase may last for a predetermined period of time and/or until the UAV is sufficiently far from the takeoff location (e.g., such as when a distance between the UAV and the takeoff location exceeds a predetermined threshold). The takeoff path 114 in FIG. 1 illustrates the path the UAV takes during the takeoff phase.

During the takeoff phase, the imaging device 104 can be controlled (e.g., by one or more processors onboard and/or offboard the UAV) to take one or more reference images 108 of the surrounding environment. For example, the imaging device may be controlled to take a reference image 108 at pose 1 112 during the takeoff of the UAV. Pose 1 112 include a position of the imaging device and/or an orientation of the imaging device relative a given reference point, such as the target location 106. The relative position of the imaging device/UAV may be expressed as (x, y, z) coordinates in a coordinate system that originates from the given reference point. The relative orientation of the imaging device may be expressed as rotation around one or more axes relative to an initial orientation of the imaging device/UAV at the given reference point. Because the imaging device is fixedly coupled to the UAV, the pose of the imaging device and the pose of the UAV may be considered substantially the same and may be referred to interchangeably.

In some embodiments, the reference image can be annotated with metadata including pose information of the imaging device and/or UAV when the given reference image is taken. The pose information can be expressed relative to a target location or any other predetermined location. For example, the pose information can include the (x, y, z) coordinates of the UAV and/or orientation of the UAV/imaging device. The metadata can also include other information such as a timestamp and other sensing data.

The UAV 102 can be configured to return to target location 106. A return phase may start when the UAV starts navigating back toward the target location. The return phase may or may not include the UAV's landing at the target location. The return phase may be triggered by an indication to return to the target location. The indication may be received from a remote source (e.g., a signal from a remote controller) and/or generated autonomously by one or more processors onboard the UAV. The return path 116 in FIG. 1 illustrates the path the UAV takes during a return phase.

The reference images taken during the takeoff phase can be used during the return phase to guide the UAV back to the target location. In particular, the imaging device can be controlled (e.g., by one or more processors onboard and/or offboard the UAV) to take one or more subject images during the return phase at any suitable pose(s). For example, the imaging device may be controlled to take a subject image 120 at pose 2 118 during the return of the UAV. Pose 2 118 include a position of the imaging device and/or an orientation of the imaging device, both of which can be considered substantially equivalent to those of the UAV as discussed above. Pose 2 118 and pose 1 112 may or may not be the same.

The subject image 120 taken during the return phase can be compared with a reference image 108 taken during the takeoff phase to determine a spatial relationship between the UAV 102 and the target location 106, or a pose of the imaging device/UAV relative to the target location. The relative pose can include a relative position and/or a relative orientation. For example, the position of the UAV/imaging device is relative to the position of the target location and the orientation of the UAV/imaging device can be relative to an initial orientation of the UAV/imaging device at the target location right before takeoff.

The subject image 120 can be compared with the reference image 108 to determine include one or more features 122 that correspond to or match one or more features 110 in the reference image 108. Such matching features can result from an overlap 124 of the field of view 119 of the imaging device at pose 2 118 and the field of view 111 of the imaging device at pose 1 112. While FIG. 1 illustrates a rotation between the pose 1 112 and the pose 2 118, it is understood that such rotation is not required or necessary. For example, in an embodiment where the imaging device is equipped with a wide-angle lens or an ultra-angle lens (e.g., fisheye lens), the fields of view may overlap without the relative rotation between the two poses.

The feature correspondence can be used to determine a transformation between the subject image and the reference image. The transformation can be used to derive a pose difference (e.g., position difference and/or orientation difference) between pose 1 and pose 2. The pose difference can be combined with metadata information (e.g., pose information) associated with the reference image to determine pose information associated with the subject image. The pose information indicates a spatial relationship between the UAV/imaging device and the target location.

The UAV can be controlled to approach the target location based on the pose/spatial relationship information determined above. For instance, control commands for one or more propulsion units of the UAV may be generated to effect a change in a state of the UAV such as an orientation, a velocity (e.g., horizontal or vertical velocity), an acceleration, and the like. Approaching the target location can include reducing a distance between the UAV and the target location. In some embodiments, approaching the target location includes landing at or near the target location.

Figure 2:
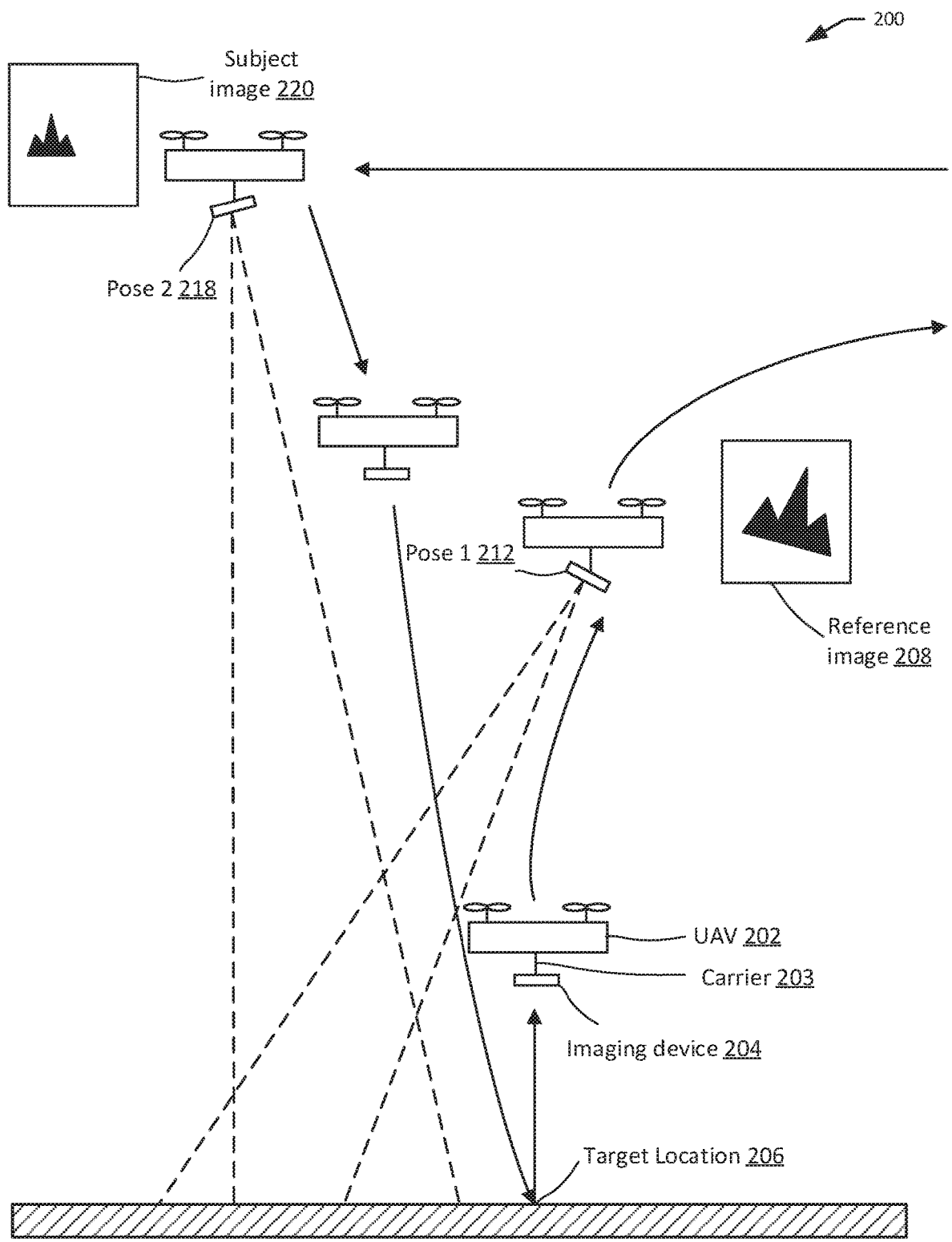
FIG. 2 illustrates another exemplary process for vision-based landing of a UAV, in accordance with embodiments.

FIG. 2 illustrates another exemplary process 200 for vision-based landing of UAV 202, in accordance with embodiments. In the illustrated embodiment, the imaging device 204 is not fixedly coupled with the UAV 202. Instead, imaging device 204 is carried by the UAV 202 via a carrier 203, which allows the imaging device 204 to move relative to the UAV with respect to up to six degrees of freedom (e.g., three degrees of translational movement and three degrees of rotational movement). As such, the pose of the imaging device may vary relative to the pose of the UAV that carries it. In cases where the imaging device is allowed to rotate relative to the UAV, the relative orientation between the imaging device and the UAV may change while the position of the imaging device can be considered substantially the same as the position of the UAV. Compared with the fixed configuration discussed in FIG. 1, the movable imaging device described in FIG. 2 allows the imaging device to scan a larger area, effectively enlarging the collective field of view of imaging device.

During the takeoff phase, the imaging device 204 can be controlled (e.g., by one or more processors onboard and/or offboard the UAV) to take one or more reference images 208 of the surrounding environment. For example, the imaging device may be controlled to take a reference image 208 at pose 1 212 during the takeoff of the UAV. Pose 1 212 include a position of the imaging device and/or an orientation of the imaging device relative a given reference point, such as the target location 206. The relative position of the imaging device/UAV may be expressed as (x, y, z) coordinates in a coordinate system that originates from the given reference point. The relative orientation of the imaging device may be expressed as rotation around one or more axes relative to an initial orientation of the imaging device/UAV at the given reference point.

In embodiments where the carrier allows the imaging device to rotate relative to the UAV, the position of the imaging device may be considered the same as the position of the UAV, but the orientation of imaging device may be different from the orientation of the UAV depending on the relative rotation between the imaging device and the UAV at the time the reference image is taken. As discussed in FIG. 1, the reference image may be annotated with metadata that includes the pose information of the imaging device and/or UAV. The metadata here may additionally include the relative spatial relationship (e.g., relative rotation) between the UAV and the imaging device.

The reference images taken during the takeoff phase can be used during the return phase to guide the UAV back to the target location. In particular, the imaging device can be controlled (e.g., by one or more processors onboard and/or offboard the UAV) to take one or more subject images during the return phase at any suitable pose(s). For example, the imaging device may be controlled to take a subject image 220 at pose 2 218 during the return of the UAV. Pose 2 218 include a position of the imaging device and/or an orientation of the imaging device. The position of the imaging device may be substantially the same as the UAV and the orientation of the imaging device may or may not be the same as the UAV. Pose 2 118 and pose 1 112 may or may not be the same.

As discussed in FIG. 1, the subject image 220 taken during the return phase can be compared with a reference image 108 taken during the takeoff phase to determine a spatial relationship between the UAV 102 and the target location 106, or a pose of the imaging device/UAV relative to the target location.

The relative movement of the imaging device relative to the UAV allows the imaging device to scan a larger area for reference images and/or subject images rather than being limited by the pose UAV. Such images may include distinguishable features that facilitate detection. In some embodiments, the carrier may be controlled (e.g., by one or more processors onboard and/or offboard the UAV) to change the orientation of the imaging device relative to the UAV based on the pose (e.g., position/orientation) of the UAV so as to capture more interesting features. In other words, the imaging device may be pointed dynamically to where potentially interesting features lie. For instance, if the takeoff location has no markings on the ground, then a downward facing imaging device is likely to capture only images of blank ground during initial takeoff. Images of blank ground may not include detectable features and thus may not facilitate feature detection and feature matching. Thus, in this case, the imaging device may be controlled to face a different direction (e.g., forward facing) during the initial takeoff. As the UAV gains altitude, the imaging device may gradually rotate toward a downward facing orientation so as to capture more interesting features on the ground (e.g., buildings). Similarly, on the return phase, the imaging device may be controlled to rotate from a downward facing orientation to a forward facing orientation as the UAV descends. In some cases, the imaging device may even point upward to capture patterns on a ceiling in an indoor environment.

Figure 3:
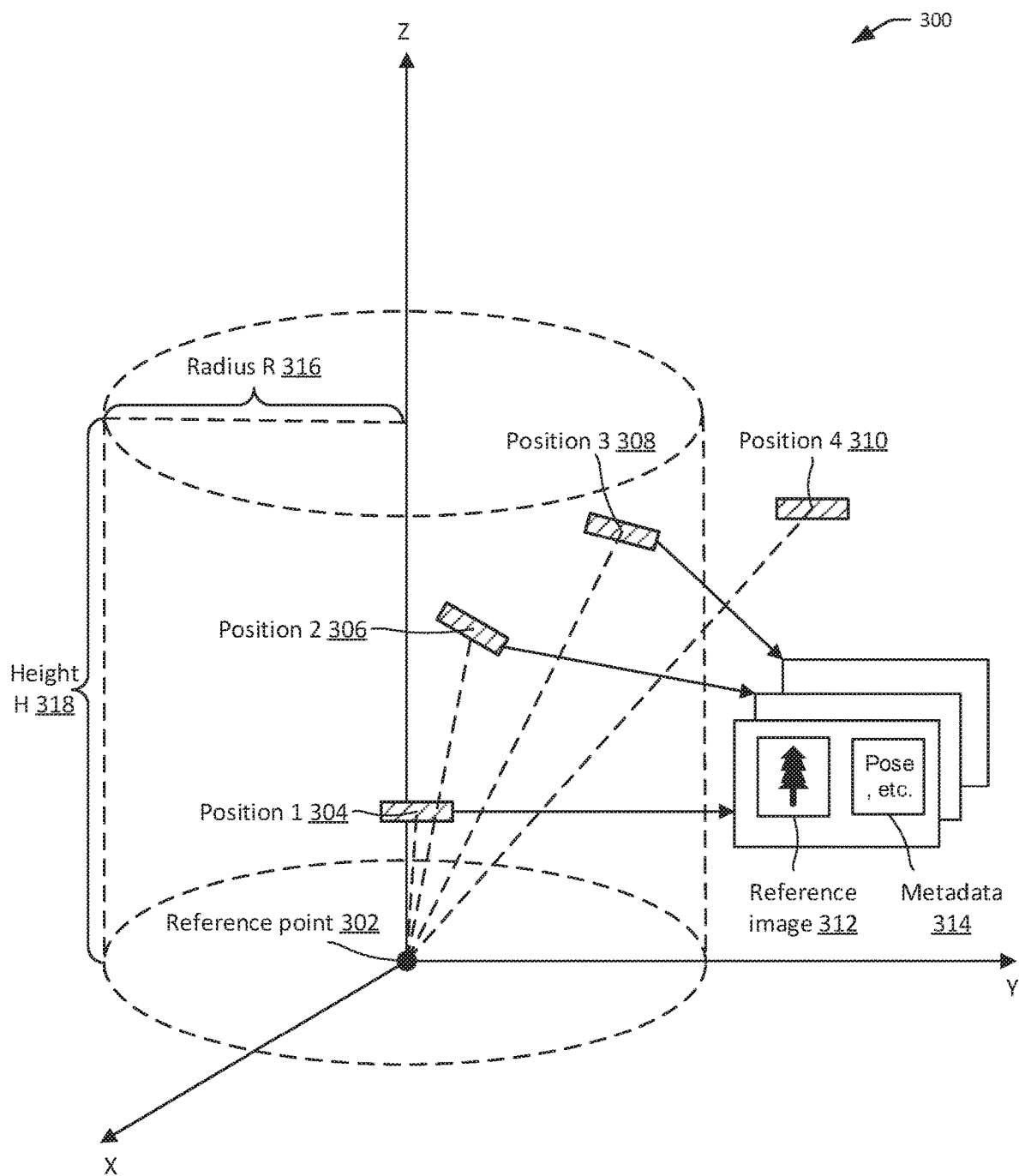
FIG. 3 illustrates an exemplary process for recording reference images, in accordance with embodiments.

FIG. 3 illustrates an exemplary process for recording reference images, in accordance with embodiments. The recording of the reference images may take place during a takeoff phase of a UAV. The striped rectangles in FIG. 3 represent the UAV or an imaging device carried by the UAV. The reference images may be used to determine a position of the UAV in a coordinate system 300. The coordinate system 300, comprises X, Y, and Z axes that intersects at a reference point 302. The reference point 302 or reference location may be a launch location for a UAV, a landing or "home" location (which may or may not be the same as the launch location), or any other predetermined location.

As the UAV takes off (from the reference location 302 or elsewhere), the imaging device carried by the UAV can be controlled (e.g., by one or more controllers onboard and/or offboard the UAV) to capture one or more reference images 312 at certain temporal or spatial intervals. Each of the reference image may be associated with metadata 314 that includes the pose information of the UAV and/or imaging device at or near the time the given reference image is taken. In some alternative embodiments, the imaging device may be controlled to continuously or periodically capture images, but only a subset of the images captures are marked as reference images and recorded with corresponding metadata.

The pose information of the UAV and/or the imaging device may be expressed relative to the reference point 302. For instance, the pose information may include the (x, y, z) coordinates of the UAV/imaging device. The pose information of the UAV may include the orientation of the UAV relative to the X, Y, and/or Z axes, or relative to an initial orientation of the UAV at or near the reference point 302. The pose information of the imaging device may include the orientation of the imaging device relative to the X, Y, and/or Z axes, relative to an initial orientation of the imaging device at or near the reference point 302, or relative to the UAV at the time the reference image is taken.

In some embodiments, the consecutive positions at which the reference images are taken are sufficiently spaced apart, so as to avoid taking redundant images. Alternatively or additionally, the reference images can be taken at certain time intervals (e.g., 0.1 second, 0.5 second, 1 second, 1.5 second, 2 second, 5 second, etc.). As illustrated in FIG. 3, the imaging device can be controlled to take images at position 1 304, position 2 306, and position 3 308, in that order, during the takeoff phase of the UAV.

In some embodiments, before recording the next reference image, a distance between the current position of the UAV and the position associated with the last-recorded reference image may be compared. In some other embodiments, the distance measured is the difference between (1) the distance between the current position and the reference point, and (2) the distance between the last position and the reference point. Only when the distance is equal to or exceeds a minimum threshold is the next reference image recorded. The next reference image may be recorded when the distance is equal to or exceeds a threshold value. The threshold value may be the same or different at different points in time. For instance, the threshold value may remain the same, increase, or decrease as time goes on. In various embodiments, the distance discussed above may be a point-to-point measurement, measurement along the X axis, Y axis, or Z axis or any combinations thereof.

The spatial or temporal interval between adjacent reference images may be predetermined. Alternatively, the spatial or temporal interval may be determined dynamically based at least in part on a state of the UAV and/or the imaging device (e.g., altitude, velocity, processing power, battery life, available storage space, etc.), an environment surrounding the UAV whether condition, terrain, etc.), remote control signals, and the like. For instance, the reference images may be recorded more frequently (i.e., shorter interval between images) when the UAV is closer to the reference location and less frequently (i.e., longer interval between images) as the UAV moves away from the reference location; and vice versa. The reference images may be recorded more frequently when more resources (e.g., processing power, battery, memory) are available on the UAV; and vice versa. In some cases, the frequency may be based on the complexity of the surrounding environment. In an embodiment, the images are recorded more frequently when the environment is more complex (e.g., in a city) and less frequently when the environment is less complex (e.g., in a desert). In another embodiment, the opposite may be true. The reference images may be recorded in response to control commands received by the UAV from a remote device such as a remote controller. For instance, a user operating the remote controller may indicate that a reference image should be recorded. The indication may be provided via an input device (e.g., joystick, button, touchscreen) associated with the remote controller. Such indication may be provided to and received by one or more processors onboard the UAV, which then control the imaging device to capture one or more reference images accordingly.

In some embodiments, more than one image can be taken at a given position. The multiple images may be associated with substantially the same position but different orientations. For example, the imaging device may be rotated while capturing images at certain intervals so as to capture multiple images (e.g., panoramic images). When the imaging device is fixedly coupled to the UAV, the UAV may be configured to yaw, pitch, or roll so as to change the orientation of the imaging device. When the imaging device is coupled to the UAV via a carrier, the carrier may be controlled to change an orientation of the imaging device instead of or in addition to an orientation change of the UAV.

In some embodiments, the UAV may be equipped with multiple imaging devices, each configured to point at a different direction. The field of views of the imaging devices may or may not overlap. Each imaging device may be configured to capture an image when the UAV is at a given position, so that multiple images associated with different imaging devices (with different orientations) can be obtained. In various embodiments, the number of images taken at each position may be fixed (e.g., 2, 5, 8, 10) or varied. For instance, the number of images to be taken may depend on a state of the UAV and/or the imaging device (e.g., altitude, velocity, battery life, available memory space), an environment surrounding the UAV, and/or remote signals, such as discussed herein.

In some embodiments, the reference images may be recorded only when the UAV is within a predetermined range (also referred as the reference recording range) from the reference point. For instance, as illustrated in FIG. 3, the reference images may be recorded only when the UAV is within a certain radius R 316 (e.g., 20 meters) from the reference point 302, and/or within a certain height H 318 (e.g., 30 meters) from the reference point. While a cylinder-shaped range (depicted in dotted lines) is illustrated in FIG. 3, it is understood that the range can have any other suitable shape such as a dome, an inverted cone, and the like. Additionally or alternatively, the recording of the reference images may be limited to a predetermined period of time after takeoff (e.g., 2 minutes) and/or a predetermined total number (e.g., 150 frames).

The recording of the reference images may stop once the UAV leaves the predetermined range or when the predetermined time period expires. For example, as illustrated in FIG. 3, no reference image is recorded at position 4 310, which falls outside the predetermined range. To the extent the reference images are used to facilitate precise landing at or near the reference point, images recorded beyond a certain range from the reference point become less useful. Thus, limiting the recording of the reference images to a spatial or temporal range can conserve the computing resources of the UAV (e.g., battery, memory, processing power) without significant impact on landing precision. Furthermore, errors associated with certain position sensors (e.g., GPS sensor) may accumulate over time, causing less accurate measurement as time goes on. Thus, by recording reference images during an early phase of a flight, more accurate pose information is obtained and associated with the reference images.

Various aspects of recording reference images discussed above may be controlled by parameters. For example, such parameters can relate to a frequency or interval for recording reference images, a range within which to record reference images, imaging device settings and/or orientation for recording reference images, and the like. Such parameters may be provided by default or user-configurable. The parameters may be preloaded in a memory unit onboard the UAV or transmitted via remote signals from a remote device when the UAV is airborne.

Figure 4:
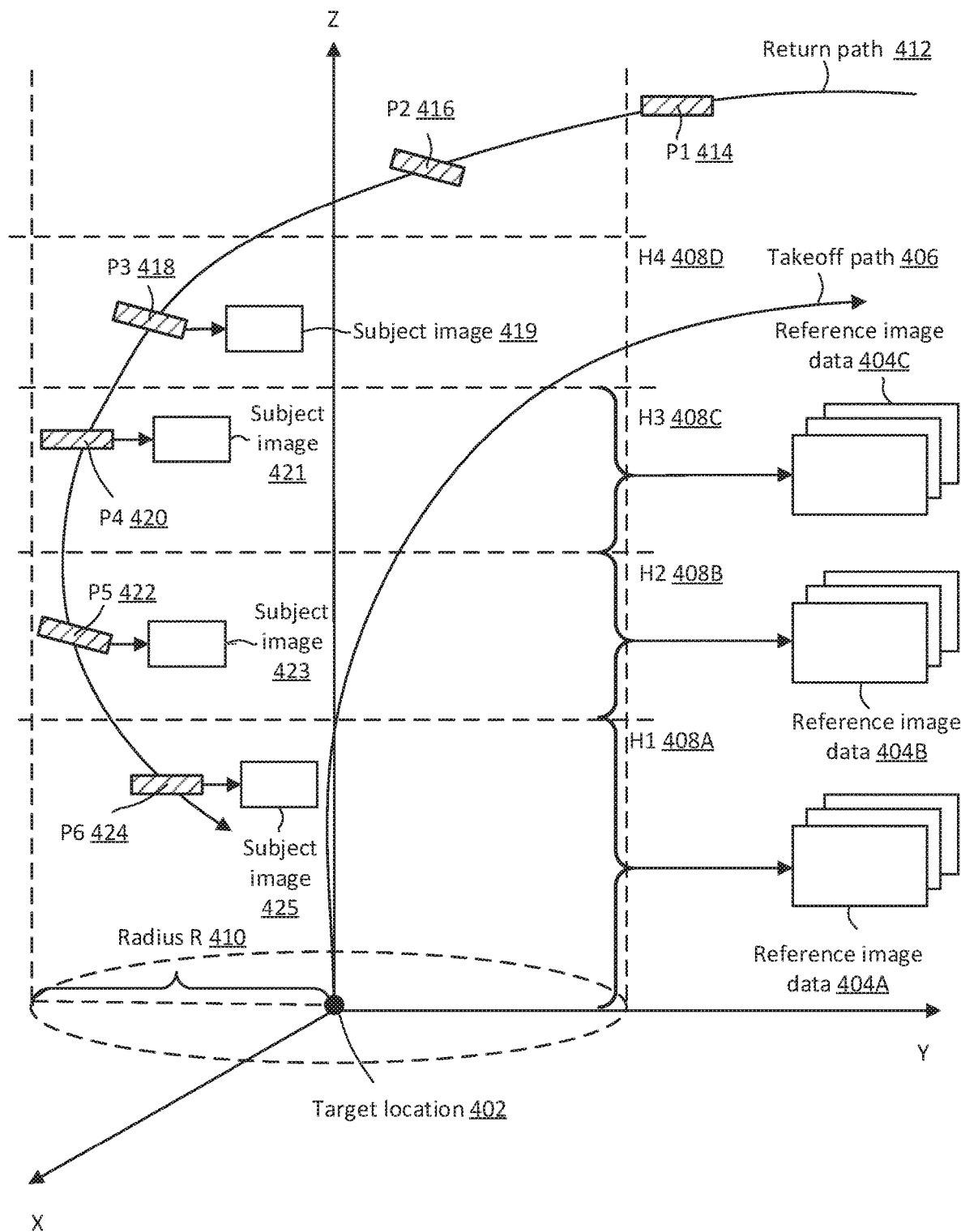
FIG. 4 illustrates an exemplary process for using previously-recorded reference images for positioning a UAV, in accordance with embodiments.

As discussed above, accuracy of measurements from position sensors may deteriorate overtime causing drifts or errors in positioning of the UAV. In such cases, images may be used to position the UAV instead of or in addition to the position sensor data. FIG. 4 illustrates an exemplary process for using previously-recorded reference images for positioning a UAV, in accordance with embodiments. In particular, the reference images may be used to help a UAV to approach (including landing at or near) a target location 402 with high precision.

The reference images may be recorded during a takeoff phase of a UAV such as discussed in FIG. 3. The images may be captured by one or more imaging devices carried by the UAV. In particular, a plurality of reference image data 404A, 404B, 404C can be recorded at different altitudes or heights H1 408A, H2 408B, and H3 408C, respectively from a reference location on a takeoff path 406. The reference location may or may not be the launch location for the UAV. The reference location may or may not be the same as the target location 402. The reference image data 404A, 404B, 404C can include reference images as well as metadata associated with the images including pose information of the UAV and/or imaging device at the time the images are taken.

Along the UAV's return path 412 to the target location, one or more subject images 419, 421, 423, 425 may be captured by the one or more imaging devices carried by the UAV. The striped rectangles in FIG. 4 represent the UAV or an imaging device carried by the UAV. The return path 412 may be part of the same flight as the takeoff path 406 without an intervening landing of the UAV. Alternatively, the return path 412 may be a different flight than the takeoff path 406 with one or more intervening landings and/or takeoffs of the UAV. The subject images may be captured by the same imaging devices that capture the reference images earlier. Alternatively, the subject images may be captured by different imaging devices carried by the UAV. For example, a first set of imaging devices are used to captured to the reference images and a second, different set of imaging devices may be used to capture the subject images.

In some embodiments, the recording of the subject images may start when the UAV moves within a predetermined range (also referred to as the subject recording range) from a reference or target location 402. The target location 402 may be an origin of a coordinate system that is the same as or different from the coordinate system described in FIG. 3. For instance, the subject images may be recorded only when the UAV is determined to be within a certain radius R 410 and/or within a certain height H4 408D from the reference/target location. For example, when the UAV/imaging device is at positions P1 414 and P2 416 which fall outside the subject recording range, no subject image is taken. The subject recording range may or may not be the same as the reference recording range discussed in FIG. 3. For example, the subject recording range may be substantially larger than the reference recording range. For instance, the radius R 410 and/or the height H4 408D may more than 2, 5, 10, or more times larger than the radius R 316 and/or the height 318, respectively, discussed in FIG. 3. The reason for the difference may be due to large field of view or wide angle of view of the imaging device. In some other examples, the subject recording range may be substantially the same as or smaller than the reference recording range. The determination of the positions of the UAV and/or imaging device (e.g., P1 414 and P2 416) may be based on measurements from one or more position sensors. Such measurements may not be accurate due to drifts and errors) but may be sufficient for estimating whether the UAV/imaging device is within a predetermined range and hence whether to trigger vision-based positioning (e.g., vision-based landing). While a cylinder-shaped range (depicted in dotted lines) is illustrated in FIG. 4, it is understood that the range can have any other suitable shape such as a dome, an inverted cone, and the like.

The recording of the subject images may be triggered by events instead of or in addition to entry into the predetermined range. For instance, the recording of the subject images may start in response to an indication to land the UAV or otherwise cause the UAV to approach a target location. The subject recording indication may be received from or generated in response to a remote signal from a remote controller. For instance, a user operating the remote controller may indicate, via an input device to the remote controller (e.g., a touchscreen, a button), that the UAV is to execute a return home routine to return to a predetermined home location (e.g., the target location 402), to land below or near the current location of the UAV, or to simply start recording subject images. In some embodiments, the subject recording indication may be generated autonomously by one or more processors onboard the UAV based on a state of the UAV (e.g., position, velocity, heading) or a component thereof (e.g., rotors, batteries, sensors). For example, the subject recording indication may be generated after detecting a failure of one or more rotors, when a battery onboard the UAV falls below a predetermined level, or when measurement errors from one or more sensors (e.g., position sensors) exceed a predetermined level. Alternatively or additionally, the subject recording indication may be triggered by an environment of the UAV such as whether, terrain, obstacles, magnetic field, and the like. For example, windy or rainy weather condition may force the UAV to land.

In some embodiments, the imaging device carried by the UAV can be controlled (e.g., by one or more controllers onboard and/or onboard the UAV) to record subject images at certain temporal or spatial intervals. In some alternative embodiments, the imaging device may be controlled to continuously or periodically capture images, but only a subset of the images captures are marked as subject images. In some embodiments, the consecutive positions at which the subject images are taken are sufficiently spaced apart, so as to reduce redundant images at around the same position. Alternatively or additionally, the subject images can be taken at certain time intervals (e.g., 0.1 second, 0.5 second, 1 second, 1.5 second, 2 second, 5 second, etc.). The spatial or temporal intervals between adjacent subject images may be predetermined. Alternatively, the spatial or temporal interval be determined dynamically based at least in part on a state of the UAV and/or the imaging device (e.g., altitude, velocity, processing power, battery life, available storage space, and the like), an environment surrounding the UAV (e.g., whether condition, terrain, etc.), remote control signals, and the like.

In some embodiments, more than one image can be taken at a given position. The multiple images may be associated with substantially the same position but different orientations. For example, the imaging device may be controlled to rotate while capturing images, so as to capture multiple images at different directions. In some embodiments, the UAV may be equipped with multiple imaging devices, each configured to point at a different direction.

The subject images captured by the imaging device(s) may be compared with the previously-recorded reference images to determine a pose (e.g., position and/or orientation) of the UAV and/or imaging device. The comparison may be used to continuously adjust the pose of the UAV so as to approach the target location 402.

In some embodiments, each subject image is compared with all of the previously-recorded reference images. Alternatively, each subject image may be compared with only a subset of the previously-recorded reference images to reduce the computing time and complexity. In an example, a subset of the reference images used for comparison with a subject image may be selected based on current orientation of the imaging device(s) associated with the subject mage. Those reference images captured with a same or similar orientation as the current orientation may be selected.

In another example, a subset of the reference images may be selected based on a current altitude at which the given subject image is taken. The reference images may be grouped based on their metadata such as an altitude range, so that a subject image is compared with only the subset of references images taken within a particular altitude range.

For example, as illustrated in FIG. 4, reference image data 404A includes reference images taken between the ground level and H1 408A, reference image data 404B includes reference images taken between H1 408A and H2 408B, and reference image data 404C includes reference images taken between H2 408B and H3 4080.

As the UAV descends towards the target location 402, the subject images taken at different altitudes may be compared with different subsets of the previously-recorded reference images. For example, the subject image 419, taken at position P3 418 above H3 408C, may be compared with the reference image data 404C which is recorded closest to the position P3 418. The subject image 421, taken at position P4 420 between H2 408B and H3 408C, may be compared with the reference image data 404C. The subject image 423, taken at position P5 422 between H1 408A and H2 408B, may be compared with the reference image data 404B. The subject image 425, taken at position P6 424 between H1 408A and ground level, may be compared with the reference image data 404A.

In some embodiments, the imaging device may be orientated such that the optical axis of the imaging device points to a predetermined direction (e.g., downward) before capturing the subject images. The predetermined direction may or may not be the same as the direction used for capturing the reference images. In some embodiments, the orientation of the imaging device may change between two consecutive subject images. The orientation of the imaging device used to capture a subject image may be determined by a state of the imaging device/UAV (e.g., altitude) and/or the metadata associated with the reference images. For example, reference image data 404C captured between heights H2 408B and H3 408C may be captured at a first imaging device orientation and the reference image data 404B captured between heights H1 408A and H2 408B may be captured at a second imaging device orientation. Such orientation information may be recorded as part of the metadata associated with the reference images. Subsequently, the imaging device may be controlled to have approximately the first orientation before taking subject images between heights 408B and H3 408C and to have approximately the second orientation before taking subject images between heights H1 408A and H2 408B. As discussed above, the orientation of the imaging device may be controlled by the orientation of the UAV and/or by a carrier supporting the imaging device.

Figure 5:
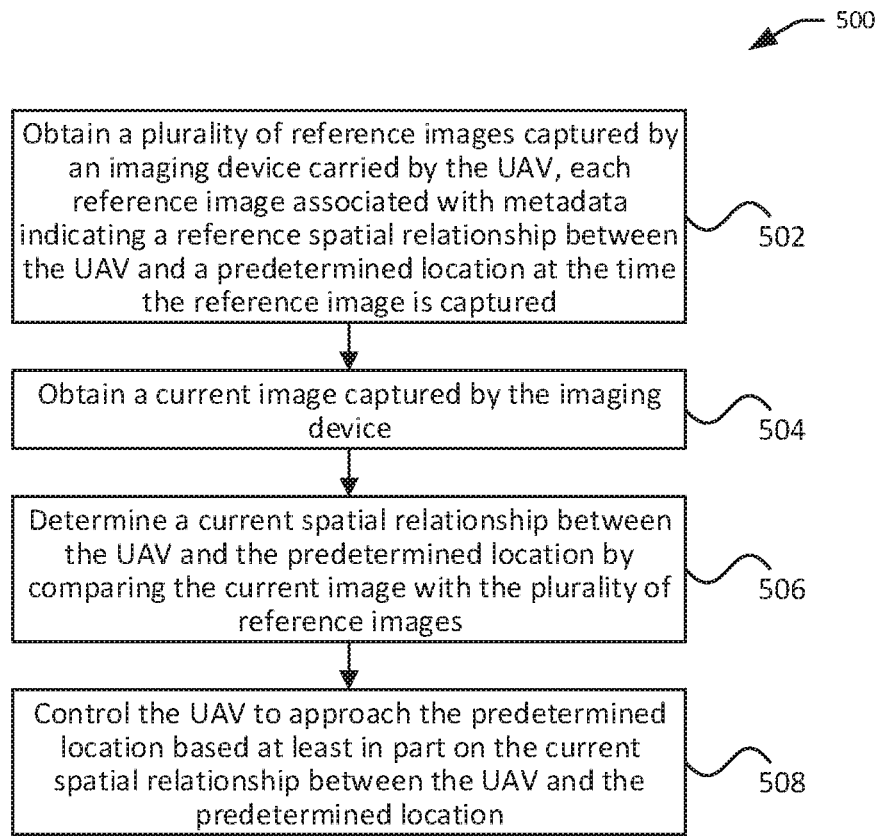
FIG. 5 illustrates an exemplary process for controlling a UAV, in accordance with embodiments.

FIG. 5 illustrates an exemplary process 500 for controlling a UAV, in accordance with embodiments. Some or all aspects of the process 500 (or any other processes described herein, or variations and/or combinations thereof) may be performed by one or more processors onboard and/or offboard a UAV. Some or all aspects of the process 500 (or any other processes described herein, or variations and/or combinations thereof) may be performed under the control of one or more computer/control systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. The order in which the operations are described is not intended to be construed as a limitation, and any number of the described operations may be combined in any order and/or in parallel to implement the processes.

At block 502, a plurality of reference images are obtained. The reference images can be captured by an imaging device carried by a UAV. The imaging device may be fixedly coupled to the UAV or coupled to the UAV via a carrier. The carrier may be configured to allow the imaging device to move with up to six degrees of freedom relative to the UAV. In some embodiments, the reference images are captured previously and then recorded in one or more memory units onboard the UAV. The reference images may also be transmitted to the UAV from a remote device or preloaded to the UAV before the UAV takes off. The reference images may be captured in one flight or in multiple different flights.

Each reference image of the plurality of reference images is associated with metadata indicating a reference spatial relationship between the UAV and a predetermined location at the time the reference image is captured. The predetermined location may be a takeoff location from which the UAV takes off. Alternatively, the predetermined location may be a location other than the takeoff location.

The metadata associated with each of the reference image can comprise pose data at the time the reference image is captured including one, two, or more of a position of the UAV (e.g., 3D coordinates), an orientation of the UAV (e.g., a rotation angle), a position of the imaging device (which may be substantially the same as the position of the UAV), an orientation of the imaging device, and the like. The pose data may be specified in terms of a coordinate system with an origin at the target location or in terms of any other suitable coordinate system. In some embodiments, the pose of the imaging device (e.g., position and/or orientation) may be specified relative to the UAV. Optionally, the metadata can additionally include state information for the UAV (e.g., velocity, altitude, acceleration, heading, battery life), time information (e.g., a times amp of when the reference image is captured), a sequence number or identifier for the reference image, and the like.

The metadata may be generated based at least in part on a measurement from one or more position sensors. The position sensors may include non-vision position sensors and/or vision-based position sensors. Examples of non-vision position sensors include GPS sensors, radars, ultrasound sensors, altimeters, barometers, and the like. Examples of vision-based position sensors include infrared sensors, lidar, and the like.

The plurality of reference images can be obtained when the UAV is within a predetermined range from the predetermined location. For example, the reference images may be recorded when a vertical distance, a horizontal distance, or a point-to-point distance between the UAV and the predetermined location is equal or less than a predetermined threshold. Additionally or alternatively, the recording of the reference images may be limited to a predetermined period of time (e.g., within the first two minutes of takeoff). The recording of the reference images may stop once the UAV leaves the predetermined range or when the predetermined time period expires.

The imaging device carried by the UAV can be controlled (e.g., by one or more controllers onboard and/or onboard the UAV) to capture reference images at certain temporal or spatial intervals. In some embodiments, the consecutive positions at which the reference images are taken are sufficiently spaced apart, so as to reduce redundant images at around the same position. For instance, obtaining the plurality of reference images can comprise obtaining a first reference image at a first UAV position, and obtaining a second reference image at a second UAV position in response to determining that a distance between the first UAV position and the second UAV position exceeds a predetermined threshold. Alternatively or additionally, the reference images can be taken at certain time intervals.

At block 504, a current image captured by the imaging device is obtained. The current image may be captured in the same flight as the reference images without intervening landings and/or takeoffs. For instance, the current image can be captured during a return or landing phase for the UAV. Alternatively, the current image may be captured in a different flight than when the reference images are captured.

In some embodiments, the current image can be obtained in response to an indication for the UAV to approach the predetermined location. Approach the UAV can landing at or near the predetermined location. Alternatively, approach the UAV getting closer to the predetermined location without actually landing. The indication can be received from a remote device that is located remotely from the UAV such as a remote controller, a mobile device, or a base station. For instance, the indication may be transmitted to the UAV based on user interaction with the remote device via as a joystick, a button, a touchscreen, a stylus, and the like. Alternatively, the indication may be generated autonomously by one or more processors onboard the UAV, for example, based on the current state of the UAV (e.g., position, orientation, velocity, acceleration) or a component thereof (e.g., battery status), an environment surrounding the UAV (e.g., weather conditions, proximity to potential obstacles, location of geographical features, location of manmade structures, etc.), and the like.

In some embodiments, the indication may be generated automatically when the UAV is determined to be within a predetermined range of a target location or during a predetermined period of time (e.g., after 15 minutes of takeoff). The position of the UAV may be determined based on measurement from one or more position sensors. The measurements from such position sensors may be less accurate than when the UAV first takes off (e.g., due to drifts and/or accumulated errors), but may be sufficient for the purpose of estimating whether the UAV is within the predetermined range from the target location.

At block 506, a current spatial relationship between the UAV and the predetermined location is determined by comparing the current image with the plurality of reference images. The current spatial relationship may be determined without using obtaining a measurement from the position sensor(s) used to determine the positions associated with the reference images. As discussed herein, drifts and internal and external errors associated with the position sensors may cause the sensors to produce increasingly less accurate measurements, leading to less accurate positioning of the UAV.

In some embodiments, determining the current spatial relationship can comprise selecting a subset of the plurality of reference images based at least in part on a current state of the UAV or the imaging device at the time the current image is captured and comparing the current image with the subset of the plurality of reference images to determine the current spatial relationship. For example, the current altitude of the UAV/imaging device may be used to select a subset of reference images that are captured at or near the same altitude. In another example, a subset of reference images captured within a certain distance from the current position of the UAV/imaging device may be obtained. In another example, a current orientation of the UAV/imaging device may be used to select a subset of reference images that are captured at substantially the same orientation.

In some embodiments, determining the current spatial relationship can comprise selecting a matching reference image from the plurality of reference images based on the comparison between the current image and the plurality of reference images. The matching reference image may be selected from the subset of the plurality of reference images, where the subset is selected as described above. A transformation between the current image and the matching reference image can be determined. And the current spatial relationship can be determined based at least in part on the transformation between the current image and the matching reference image.

Features may be detected from the reference images and the current image. The features detected from the current image may be matched against the features detected in the reference images to determine feature correspondence. The reference image determined to mostly match with the current image may be selected as the matching reference image. For instance, the matching reference image may have the largest number or area of feature correspondence or overlap with the current image relative to the other reference images.

Any suitable feature detection and/or matching techniques may be used to detect res such as edge detection techniques Canny, Deriche, differential, Sorbel operator, Prewitt operator, Roberts cross operator, etc.), corner detection techniques (e.g., accelerated segment test (FAST), Harris operator, Shi-Tomasi, level curve curvature, smallest univalue segment assimilating nucleus (SUSAN), etc.), blob detection techniques (e.g., Laplacian of Gaussian (LoG), difference of Gaussians (DoG), Determinant of Hessian (DoH), maximally stable external regions, principal curvature-based region detector (PCBR), etc.), ridge detection techniques, Hough transform, structure tensor, affine invariant feature detection techniques affine shape adaptation, Harris affine, Hessian affine, etc.), and feature description techniques (e.g., scale-invariant feature transform (SIFT), speeded up robust features (SURF), gradient location and orientation histogram (GLOH), histogram of oriented gradients (HOG), etc.), random sample consensus (RANSAC), and the like. In some examples, spatial intensity information may be used to direct search for matches to positions that yield the best match using techniques such as Kanade-Lucas-Tomasi (KLT) feature tracker. Such techniques may be faster and less costly than traditional image registration techniques, making the techniques especially suitable for implementation by devices with limited computational resources, such as a UAV.

A transformation between the c reference image and the current image may be determined based on the feature correspondence. The transformation may be used to derive a relative pose difference (e.g., a relative position and/or a relative orientation) between a first pose of the imaging device used to capture the matching reference image and a second pose of the imaging device used to capture the current image. For example, relative pose difference may be determined by solving a Perspective-N-Point (PNP) problem. The second pose of the imaging device relative to a predetermined location can then be determined based on the relative pose difference and the first pose of the imaging device that is associated with the matching reference image as part of the metadata. Such metadata may indicate, for example, a spatial relationship to a predetermined location. The second pose of the imaging device, derived from the first pose and the pose difference, can indicate a spatial relationship between the imaging device/UAV and the predetermined location. The second pose of the imaging device may also indicate a relative rotation between the current heading of the imaging device/UAV and an initial orientation of the imaging device/UAV at the predetermined location.

At block 508, the UAV can be controlled to approach (including to land at or near) the predetermined location based at least in part on the current spatial relationship between the UAV and the predetermined location. In particular, control commands may be generated for controlling one or more propulsion units of the UAV, so as to change a state of the UAV (e.g., vertical velocity, horizontal velocity, heading). In some embodiments, a control-feedback-loop mechanism may be used. For example, one or more proportional-integral-derivative (PID) controllers may be used to control a vertical velocity and/or a horizontal velocity of the UAV to reduce, respectively, the vertical deviation and/or the horizontal deviation of the UAV from the predetermined location.

Figure 6:
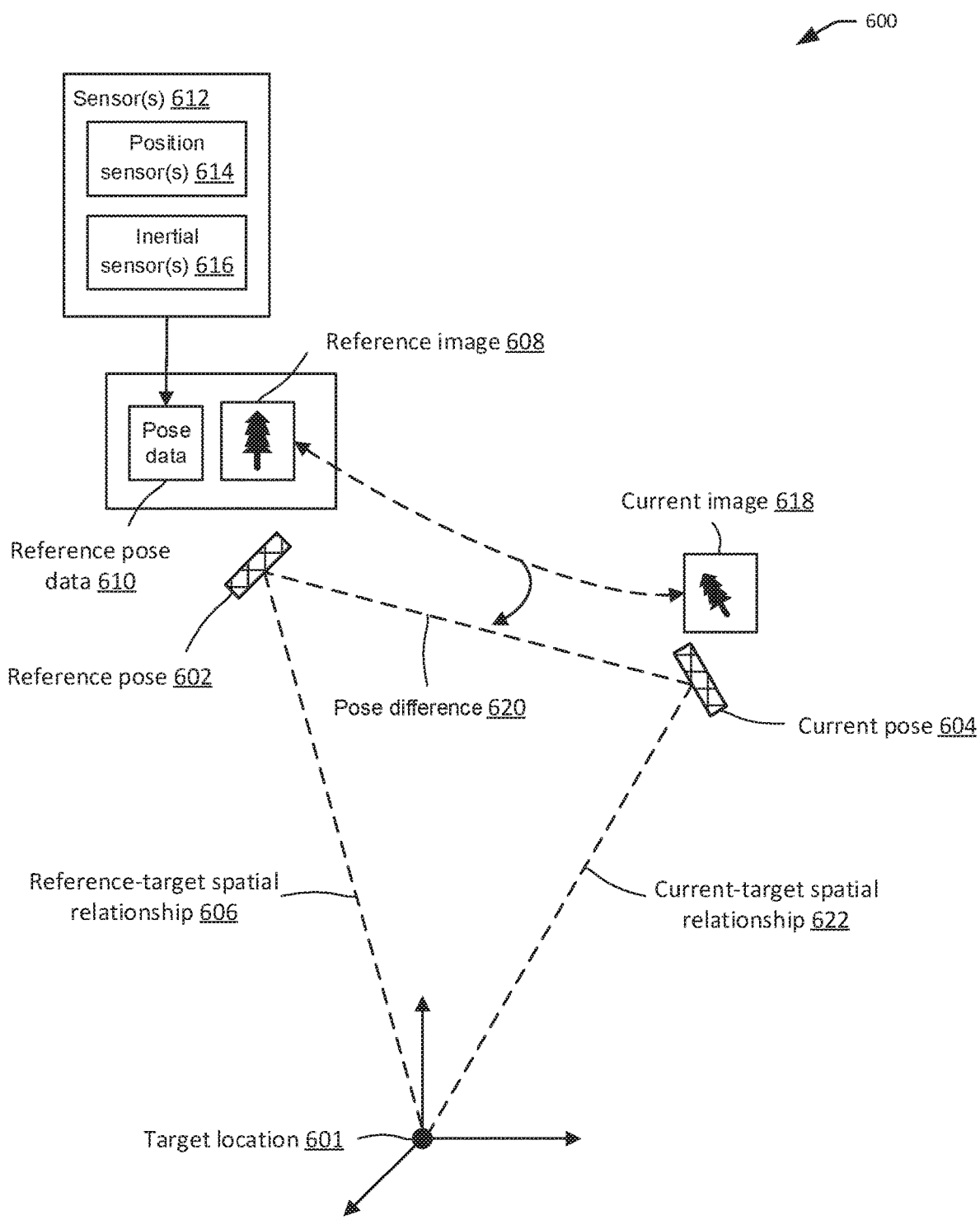
FIG. 6 illustrates an exemplary process for pose estimation, in accordance with embodiments.

FIG. 6 illustrates an exemplary process 600 for pose estimation, in accordance with embodiments. The process 600 may be used to determine a current-target spatial relationship 622 between a UAV/imaging device and a target location 601 by comparing a current image 618 obtained at the current pose 604 with a reference image 608 obtained at a reference pose 602, the reference pose 602 indicating reference-target spatial relationship 606.

As illustrated, a reference image 608 is obtained when the UAV/imaging device is positioned and/or oriented at the reference pose 602. Reference pose data 610 describing the reference pose 602 may be calculated based on sensor data from one or more sensors 612. The sensors 612 may be carried by the UAV and/or the imaging device or located in an environment surrounding the UAV. Examples of such sensors 612 can include position sensors 614 (e. GPS, infrared, lidar, ultrasound) and inertial sensors 616 (e.g., inertial measurement unit (IMU)). The reference pose data 610 can indicate a reference-target spatial relationship 606 (e.g., relative displacement and/or rotation) between the reference pose 602 and the target location 601.

A current image 618 can be obtained when the UAV/imaging device is positioned and/or oriented at the current pose 604. The current pose 604 may be estimated without relying on measurements from some or all of the sensors 612. In some cases, the sensors 612 may be inoperable or fail to provide accurate measurements due to internal errors and/or external factors (e.g., collision, heat). In some embodiments, the pose estimated without using the sensors 612 may be used to calibrate the sensors 612 or otherwise correct the measurements from the sensors 612.

In some embodiments, the current pose 604 may be estimated as follows. The current image 618 can be compared with the reference image 608 to determine a transformation therebetween, for example, using corresponding feature points. The transformation can be used to derive a pose difference 620 between the reference pose 602 and current pose 604 (e.g., a relative displacement and/or relative rotation), for example, by solving the PNP problem. Accordingly, the current pose can be estimated by applying the pose difference 620 to the reference pose 602. In other words, a current-target spatial relationship 622 between the UAV/imaging device and the target location 601 can be determined by combining the current-reference spatial relationship (as indicated by the pose difference 620) and the reference-target spatial relationship 606.

Figure 7:
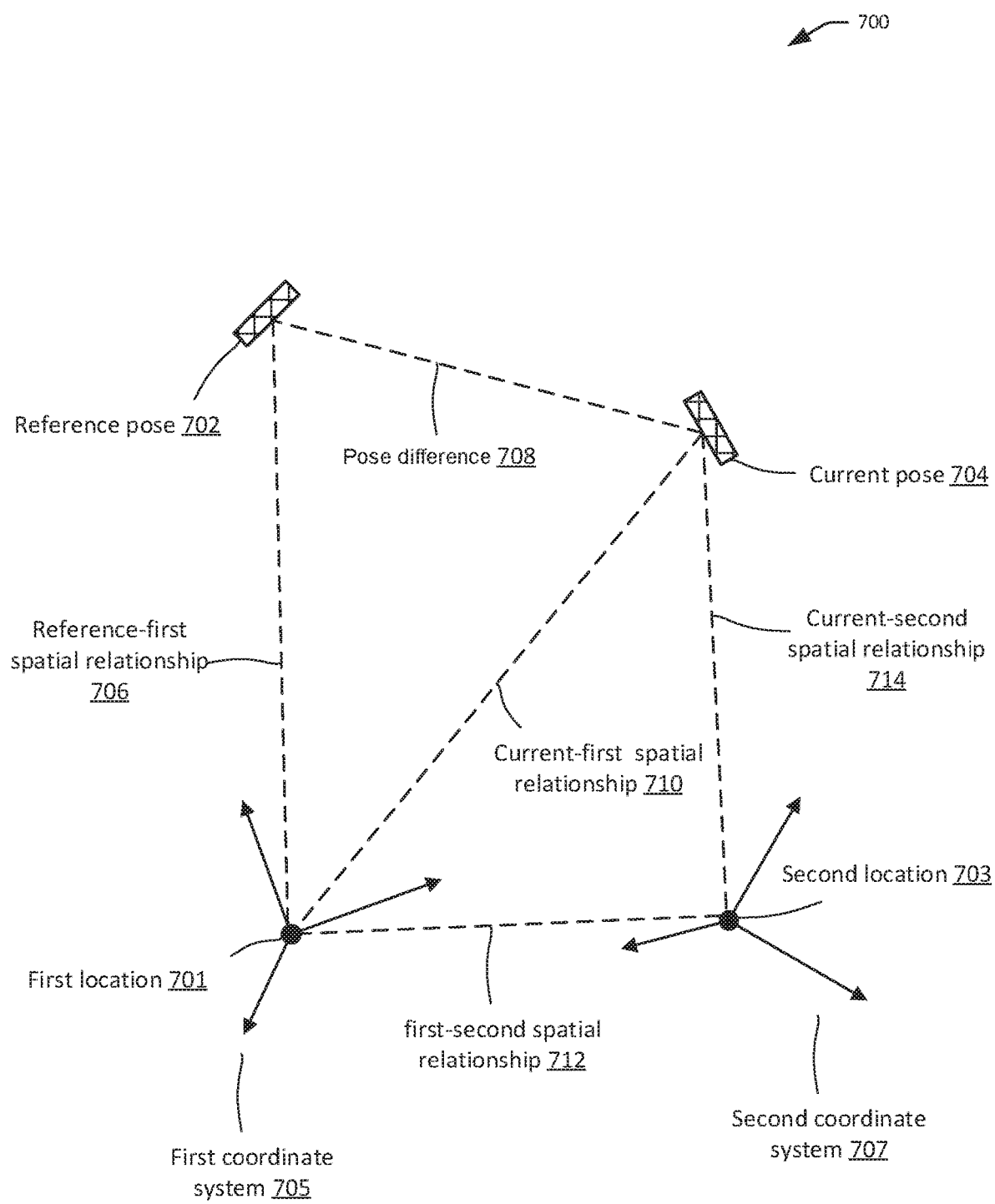
FIG. 7 illustrates another exemplary process for pose estimation, in accordance with embodiments.

FIG. 7 illustrates another exemplary process for pose estimation, in accordance with embodiments. Rather than determining poses of the UAV/imaging device relative to the same coordinate system, as illustrated in FIG. 6, the poses can be determined relative to different coordinate systems.

As illustrated, the reference pose 702 at which a reference image is taken indicates a reference-first spatial relationship 706 between the UAV/imaging device and a first coordinate system 705, with an origin at the first location 701. As discussed in FIG. 6, a pose difference 708 between a current pose 704 and the reference pose 702 can be determined by comparing the reference image and the current image. The pose difference 708 can be combined with the reference-first spatial relationship 706 to determine a current-first spatial relationship 710.

The current pose 704 can be measured relative to a second coordinate system 707. The second coordinate system 707 may have an origin, second location 703, that is different from the first location 701. For example, the first location 701 may be the launch location for the UAV and the second location 707 may be any location where a relatively reliable position measurement is obtained. The position measurement may be obtained from a position sensor such as a GPS sensor. As the UAV moves through an environment, the UAV's ability to obtain accurate position measurement may vary depending on internal and/or external factors. For example, GPS signals may be lost when the UAV moves among tall buildings a city but become stronger when the UAV reaches an open field. The second location 703 that is used as an origin for the second coordinate system may be any location where strong GPS signals are obtained. For example, the second location 703 may be on the UAV's flight path, such as on a takeoff path or a return path.

Using the second coordinate system 707, a current-second spatial relationship 714 can be determined between the current pose 704 and the second location 703. As such, the first-second spatial relationship between the first coordinate system 701 and the second coordinate system 702 can be determined based on the current-second spatial relationship 714 and the current-first spatial relationship 710. Accordingly, the UAV can be controlled to approach the first location 701 given the UAV's current pose 704 in the second coordinate system 707 and the first location's position in the second coordinate system 707.

Figure 8:
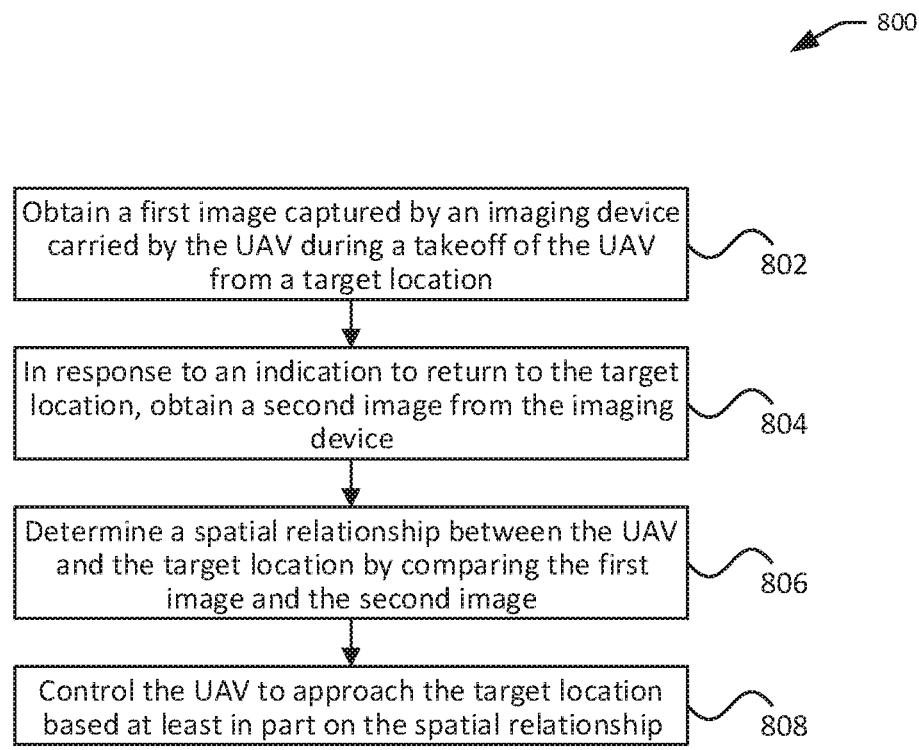
FIG. 8 illustrates another exemplary process for controlling a UAV, in accordance with embodiments.

FIG. 8 illustrates another exemplary process 800 for controlling a UAV, in accordance with embodiments. Aspects of the process 800 may be performed by one or more processors onboard and/or offboard a UAV.

At block 802, a first image captured by an imaging device is obtained. The imaging device is carried by a UAV. The first image is captured during a takeoff of the UAV from a target location. For example, the first image can be captured immediately before or at the moment the UAV leaves the target location. Alternatively, the first image can be captured after the UAV has left the target location. As the UAV continues on its takeoff path (i.e., moving away from the target location), more than one reference images, including the first image, may be taken. In some embodiments, the recording of the reference images can be limited to when the UAV is within a predetermined spatial range from the target location, a predetermined duration of time, a predetermined total number of frames, and the like. The recording of the reference images may stop after such predetermined range, duration, and/or total number has been reached. Alternatively, the recording of the reference images may be unlimited or arbitrary. In some embodiments, consecutive reference images may be recorded with predetermined intervals (e.g., temporally and/or spatially) to reduce redundancy. Alternatively, the reference images may be recorded randomly or pseudo-randomly.

The first image can be recorded with metadata including a first pose (e.g., position and/or orientation) of the imaging device and/or the UAV when the first image is captured. The position of the imaging device may be substantially the same as the UAV. The orientation of the imaging device may be different from that of the UAV depending on the relative orientation between the imaging device and the UAV. The pose information may indicate a spatial relationship between the first imaging device and the target location.

The first image may include an image of the target location from which the UAV takes off. For instance, the first image may be captured with the imaging device pointing straight down and/or the first image may be captured immediately before or after the UAV leaves the ground. In some cases, the target location may be marked with one or more visual markings (e.g., barcodes, geometric patterns) to facilitate detection. Alternatively, the first image may not include the target location. For example, the first image may be captured when the imaging device points straight ahead, and/or the first image may be captured after the UAV has left the ground for a while.

At block 804, a second image is obtained from the imaging device in response to an indication to return to the target location. The second image may be captured during the same flight as the first image without intervening landings and/or takeoffs. For instance, the second image can be captured during a return or landing phase for the UAV, after the recording of the reference images. Alternatively, the second image may be captured in a different flight than when the reference images are captured. The second image and the first image may include one or more overlapping portions. The overlapping portions may include the target location. Alternatively, the overlapping portions may not include the target location.

The indication to return to the target location may be received from a remote device that is located remotely from the UAV such as a remote controller, a mobile device, a base station, another UAV, manned aircraft, or the like. Such indication may be transmitted from such remote device in response to user input. The user input may be provided via a joystick, a button, a touchscreen, a stylus, a wearable device (e.g., helmet, glasses, watch, vest) and the like. For instance, a user may select a "Go Home" control on a user interface provided by a mobile application (app) for controlling the UAV. The mobile application may run on a mobile device (e.g., smartphone or tablet). In another example, the user may press a button, flip a switch, or change a position of a control stick on a remote controller to effectuate similar control. In another example, the user may change a pose (e.g., position and/or orientation) of a remote device by hand or by movement of another body part that is wearing or carrying the remote device. Control commands may be generated based on such user inputs and transmitted to the UAV.

In some other embodiments, the indication may be generated autonomously by one or more processors onboard and/or offboard the UAV, without user intervention. For example, the indication may be generated based on the current state of the UAV (e.g., position, orientation, velocity, acceleration) or a component thereof (e.g., battery status), an environment surrounding the UAV (e.g., weather conditions, proximity to potential obstacles, location of geographical features, location of manmade structures, etc.), and the like. For example, one or more processors onboard and/or offboard the UAV may determine that the UAV is within a predetermined landing range of the target location, that the UAV has been flying longer than a predetermined length of time or distance, and/or that one or more position sensors are inoperable (e.g., damaged or out of power), or are generating inaccurate or otherwise unusable measurement. Based on the determination, the one or more processors may generate the indication to capture the second image so as to facilitate precise positioning and/or landing of the UAV.

In some embodiments, the second image may be captured in response to both user-initiated signals and sensor data. For example, in an embodiment, a user may activate an auto-return or auto-landing function via a user interface provided by an application for controlling the UAV. The application may run on a remote device such as a remote controller a mobile device (e.g., smartphone or tablet). In response to the user control, the UAV may be controlled to move toward a target location (e.g., home location). Based on sensor data from one or more sensors (e.g., GPS sensors) onboard the UAV, the processors onboard the UAV may determine that the UAV is within a predetermined range from the target location. In response to this determination, the processors may initiate the vision-based landing process discussed herein, where the second image is captured and compared with previously-recorded images (e.g., the first image) to effectuate precise landing of the UAV.

In some embodiments, the first image is captured at a first orientation of the imaging device and the second image is captured at a second orientation of the imaging device. The first orientation and the second orientation may be the same. In an example, the first orientation is recorded as part of the metadata for the first image. Based on the metadata, the imaging device may be oriented such that the second orientation is substantially the same as the first orientation before capturing the second image. In some other embodiments, the first orientation may not be the same as the second orientation.

At block 806, a spatial relationship between the UAV and the target location is determined by comparing the first image and the second image. In some embodiments, the first image is captured at a first pose of the imaging device and the second image is captured at a second pose of the imaging device. Determining the spatial relationship between the UAV and the target location can comprise determining a transformation between the first pose and the second pose based on the comparison between the first image and the second image and determining the second pose based at least in part on the first pose and the transformation. Exemplary steps for implementing block 806 are discussed in FIGS. 6-7. In some embodiments, the first pose is indicated relative to a first coordinate system (e.g., with an origin at the target location) and the second pose is indicated relative to second coordinate system (e.g., with an origin that is not the target location). In such embodiments, the position of the target location within the second coordinate system can be derived based on the second pose (relative to the second coordinate system) and the spatial relationship between the UAV and the target location.

At block 808, the UAV is controlled to approach the target location based at least in part on the spatial relationship determined in block 806. The target location's position and the UAV's position can be described using the same coordinate system (e.g., the second coordinate system described above). In some embodiments, controlling the UAV to approach the target location comprises generating control signals for one or more propulsion units of the UAV based at least in part on the spatial relationship. The propulsion units may cause a change in a horizontal velocity, a vertical velocity, or an orientation of the UAV. One or more PID controllers may be used to generate such control signals.

Figure 9:
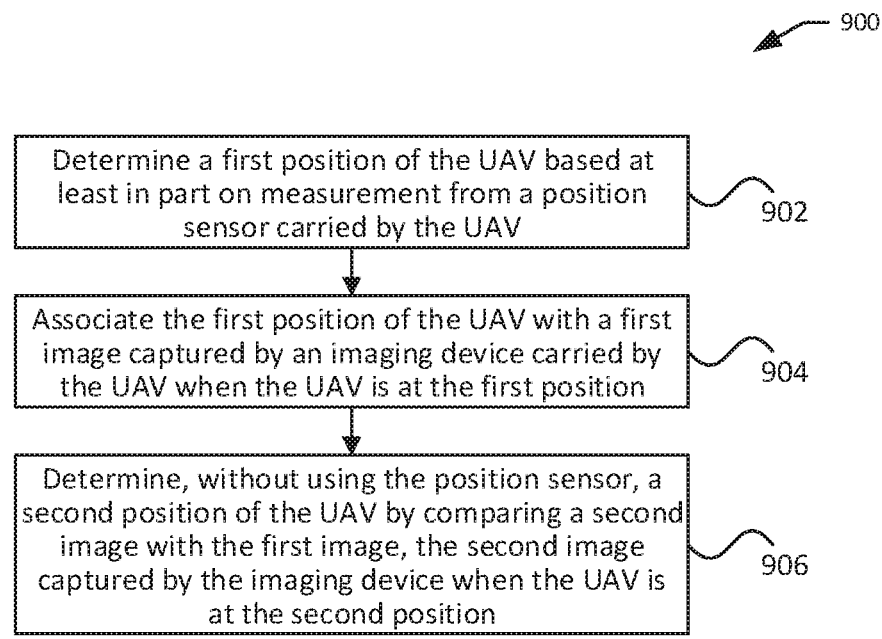
FIG. 9 illustrates another exemplary process for controlling a UAV, in accordance with embodiments.

FIG. 9 illustrates another exemplary process 900 for controlling a UAV, in accordance with embodiments. Aspects of the process 900 may be performed by one or more processors onboard and/or offboard a UAV.

At block 902, a first position of the UAV is determined based at least in part on measurement from one or more position sensors carried by the UAV. The position sensors may include vision sensors and/or non-vision sensors. Examples of position sensors can include GPS sensors, radars, ultrasound sensors, altimeter, infrared sensors, lidar, and the like. In some embodiments, the first position of the UAV may be determined based on measurements from the non-vision sensors alone, vision sensors along, or a combination of both.

In some embodiments, the imaging device can be controlled to capture the first image based at least in part on a determination that the UAV is within a first predetermined range from a target location. In some cases, the position sensors are used to determine the first position of the UAV within a predetermined time period after a calibration of the sensors (e.g., before takeoff). Thus, the measurement from such sensors may be relatively more reliable compared with subsequent measurements, which may become less accurate due to internal and/or external factors.

At block 904, the first position of the UAV is associated with a first image. The first image is captured by an imaging device carried by the UAV when the UAV is at the first position. The first image may be a reference image that can be compared with a subsequent image to facilitate positioning of the UAV without using the position sensors and/or to calibrate the position sensors. The first image may be part of the metadata associated with the reference image as discussed above. The metadata may also include other information about the first image, the UAV, and/or the imaging device at the time the first image is captured. For example, the metadata may include a velocity or an orientation of the UAV, an orientation of the imaging device, settings of the imaging device (e.g., focal length, resolution), a timestamp, and the like.

At block 906, a second position of the UAV is determined without using the position sensor, by comparing a second image with the first image. The second image is captured by the imaging device sometime after the first image is taken, when the UAV is at the second position. The second position may or may not be the same as the first position. For example, the first image may be captured by the imaging device during a takeoff of the UAV and the second image may be captured by the imaging device during a landing of the UAV. In another example, the first image is taken during a takeoff and the second image is taken before the UAV starts descending. In another example, both the first image and the second image are taken during the same phase of operation (e.g., takeoff, cruising, landing). The first image and the second image can be captured during a same flight of the UAV without intervening stops for the UAV. In some embodiments, the first image may be taken at a first flight and the second image may be taken at a later, second flight with at least one intervening stop between the first and second flights.

The imaging device can be configured to capture the second image based at least in part on a determination that the UAV is within a second predetermined range from a target location. Where the first image is taken within a first predetermined range from the target position, the first predetermined range may be substantially the same as or substantially different from the second predetermined range (e.g., substantially larger or substantially smaller). The UAV may be determined to be within the second predetermined range based on measurement from at least one of the position sensors used to determine the first position in block 902. The measurement may not be precise enough for the purposes of determining the second position; but may be sufficient for determining whether the UAV is within a range of positions. The second image may be taken when the measurement from the position sensors are determined to be unsuitable for se in determining a position of the UAV. For example, relatively more precise position measurement data may be required during certain operations of the UAV (e.g., landing) than during other operations (e.g., cruising). During such operations, the one or more processors onboard and/or offboard the UAV may switch from using position sensor data to using visual positioning described herein.

In some embodiments, the second position determined above may be used, at least in part, to generate local control commands for controlling the UAV to land at or near a target location. For instance, the second position may be expressed relative to the target location. The relative relationship between the second position and the target location can be used to generate one or more local command for components carried by (i.e., local to) the UAV (e.g., propulsion units). In some embodiments, the UAV may be controlled to land entirely based on the local control commands. In other embodiments, one or more processors onboard the UAV may be configured to receive, from a remote device, one or more remote control commands for controlling the UAV during the landing of the UAV. The one or more processors may be configured to generate combined control commands for the controlling the UAV based on the local control commands and the remote control commands.

Depending on the types of the remote control commands, the remote control commands may modify or augment aspects of the existing local control commands (e.g. increasing and/or decreasing a velocity or a heading of the UAV). In an example, when the user pushes the throttle down on a remote controller during a vision-based landing discussed herein, then the UAV may be controlled to descend at a vertical velocity that is the sum of the vertical velocity as indicated by the local control commands and the vertical velocity as the indicated by the remote control commands. Alternatively or additionally, the remote control commands may cause the local control commands to be paused, delayed, or aborted. In an example, when the user pushes the throttle up on a remote controller or indicates a change in a yaw or a pitch of the UAV during the vision-based landing discussed herein, then the vision-based landing may be aborted as a whole or in part. In other words, the UAV may stop implementing precise landing based on image processing. Rather, the UAV may hover in place, keep landing using other methods (e.g., using position sensors), or operating according to the remote control commands (e.g., move up or change orientation). In some alternative embodiments, the local control commands may trump some or all of the remote control commands.

Figure 10:
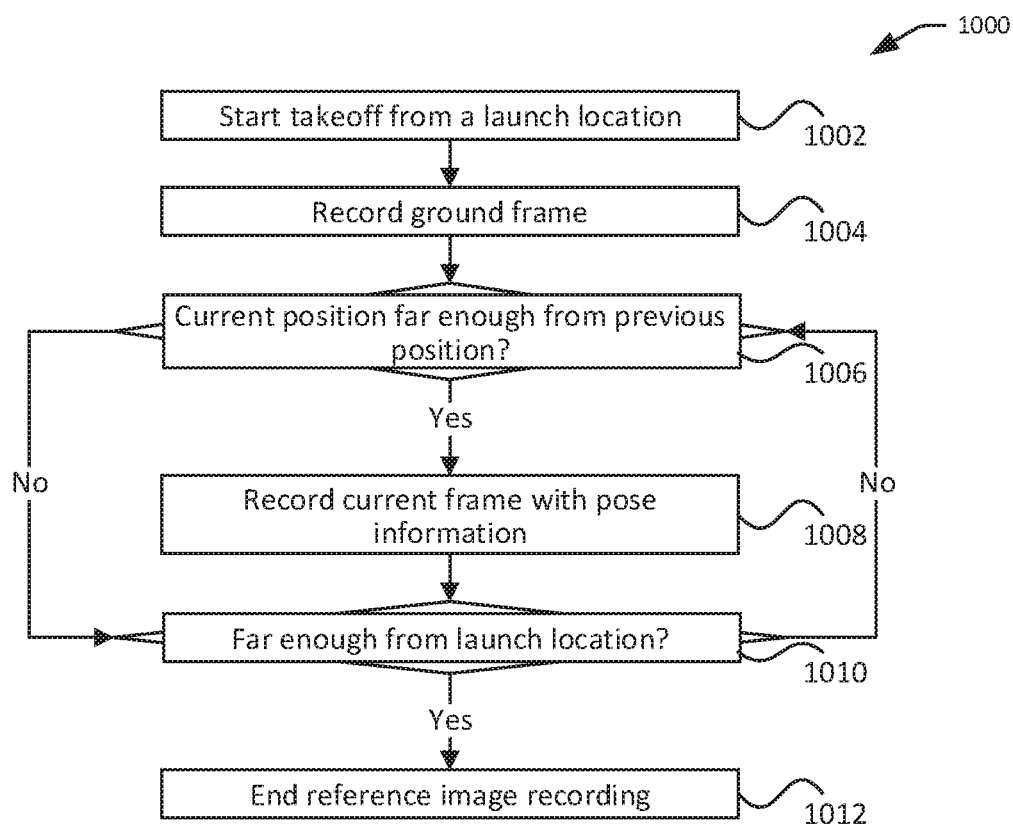
FIG. 10 illustrates an exemplary process for recording reference images during a takeoff of a UAV, in accordance with embodiments.

FIG. 10 illustrates an exemplary process 1000 for recording reference images during a takeoff of a UAV, in accordance with embodiments. Aspects of the process 1000 can be implemented by one or more processors onboard the UAV. The reference images may be captured by an imaging device carried by the UAV.

At block 1002, the UAV is controlled to start to takeoff from a launch location. For instance, one or more propulsion units (e.g., rotors) of the UAV may be controlled to start so as to generate lift necessary for takeoff.

At block 1004, the UAV may be configured to record an image of the ground, a ground frame, at or near the time the UAV lifts off from the ground. The ground frame can be considered a reference image. In some embodiments, block 1004 may be optional.

At block 1006, it is determined whether the current position is far enough from the previous position at which a reference image is taken. For example, a distance between the current position and the previous position can be compared with a threshold. If the distance is equal to or exceeds the threshold, then the current position may be determined to be far enough.

If it is determined that the current position is far enough from the previous position, then at block 1008, a current frame (a reference image) is recorded by the imaging device at the current position. The current frame can be recorded with the current pose of the imaging device and/or UAV such as position and orientation. The current frame may also be associated with other metadata such as timestamp, imaging device settings, UAV velocity, weather condition, and the like. The current frame and its associated metadata may be stored in one or more memory units onboard the UAV. Alternatively or additionally, the current frame and/or its metadata may be transmitted to a remote device.

At block 1010, it is determined whether the UAV is far enough from the launch location. For example, it may be determined whether the UAV is currently located within or outside a predetermined range from the launch location (e.g., 20 m in radius and 30 m in altitude from the launch location). If it is determined that the UAV is far enough from the launch location (e.g., outside the predetermined range), then the recording of the reference images ends at block 1012. If it is determined that the UAV is not far enough from the launch location (e.g., still within the predetermined range), then the process 1000 loops back to block 1006 to record additional reference frames. In various embodiments, the decision blocks 1006 and 1010 may be implemented periodically in any suitable frequency (e.g., every 0.01, 0.1, 2, or 5 seconds).

Figure 11:
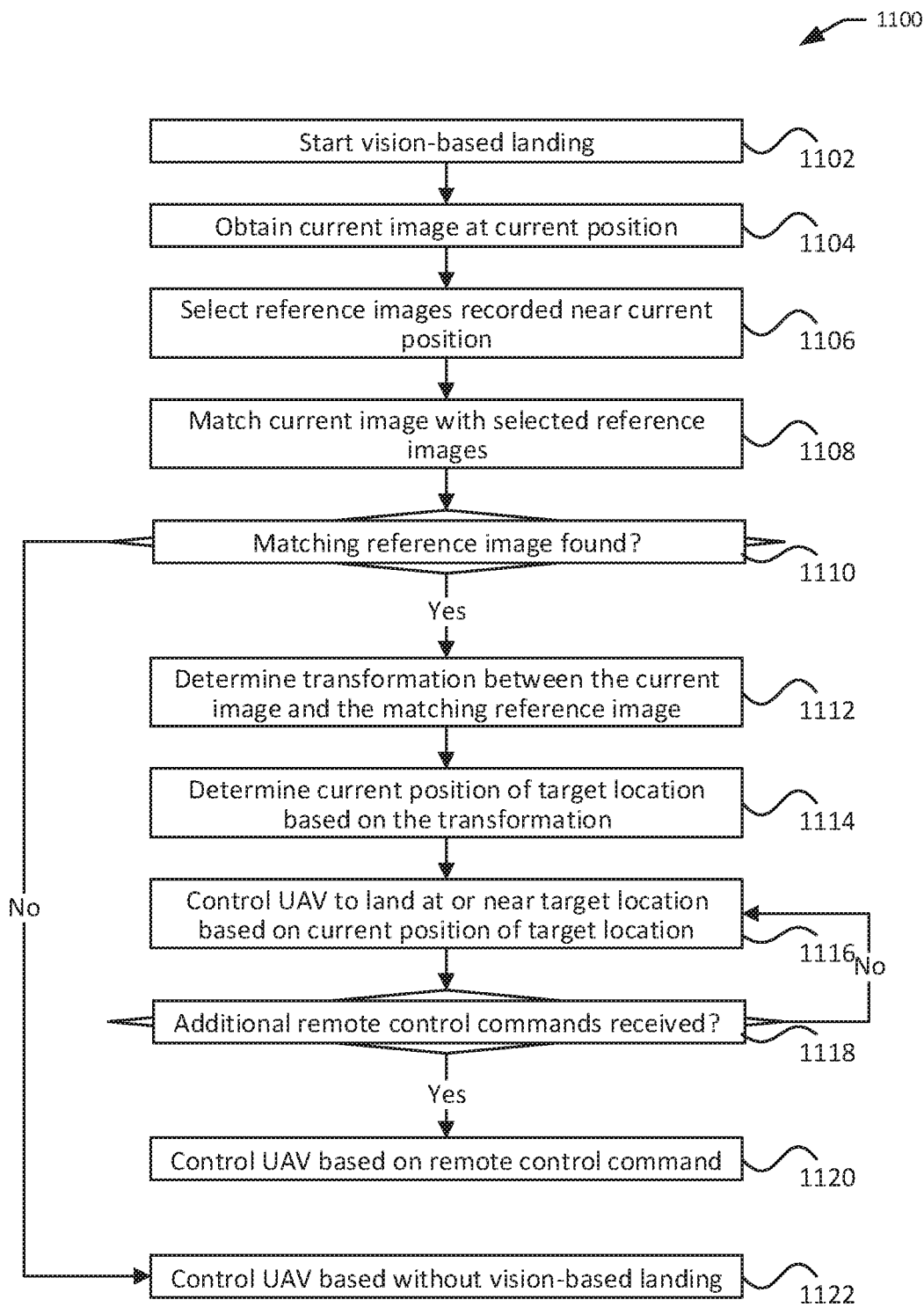
FIG. 11 illustrates an exemplary process for landing a UAV using previously-recorded reference images, in accordance with embodiments.

FIG. 11 illustrates an exemplary process 1100 for landing a UAV using previously-recorded reference images, in accordance with embodiments. Aspects of the process 1100 can be implemented by one or more processors onboard the UAV.

At block 1102, vision-based landing process is started. The vision-based landing process can be started in response to an indication received by the UAV from a remote device and/or an indication generated by the UAV. For instance, in an embodiment, a user may use a remote controller to issue a remote command for activating an automatic return functionality of the UAV, which causes the UAV to return to a specific home location. One or more processors onboard the UAV may receive the remote command and in response, use sensor data from one or more position sensors carried the UAV (e.g., GPS sensors) to navigate the UAV toward the home location. Once the UAV is within a predetermined range of the home location, the one or more processors may initiate the vision-based landing process, which may facilitate more precise landing of the UAV. In another embodiment, a user may use a remote controller to directly issue a remote command for initiating the vision-based landing process.

At block 1104, the current image is obtained at the current position of the UAV. The current image can be captured by an imaging device carried by the UAV. In some embodiments, the orientation and/or position of the imaging device may be adjusted (e.g., via movement caused by carrier or by the UAV), before the current image is captured. For instance, the imaging device may be controlled to point straight down or at a predetermined orientation which may be the same as the orientation used to capture one or more reference images discussed above in FIG. 10. In some other embodiments, the orientation of the imaging device is not adjusted before capturing the image.

At block 1106, a subset of the reference images is selected from the previously-recorded reference images such as those discussed in FIG. 10. The subset of reference images may be selected based on the current position of the current image. For instance, the subset of reference images may be recorded at or near the current position (e.g., similar altitude). The metadata associated with the reference images can be compared with the current position to determine which reference images to select. Such selection of reference images reduces the amount of computation (e.g., image matching) that need to be performed.

At block 1108, the current image is matched with the selected subset of reference images. In an example, the current image is compared with each of the selected reference images to determine whether there is any overlap or feature correspondence between the current image and the reference image. Any suitable image matching and/or image registration techniques can be used, such as FAST and RANSAC. The reference image that overlaps with the current image can be selected as the matching reference image. Where multiple reference images overlap with the current image, the reference image with the most overlap can be selected as the matching reference image.

At block 1110, it is determined whether a matching reference image is found in block 1108. In some cases, there may not be any correspondence between the reference images and the current image. If such cases, then at block 1122, the vision-based landing may be aborted or the UAV may be controlled to land using an ordinary procedure (e.g., using ultrasound sensors or other position sensors). Alternatively, further images may be obtained and compared with the reference images to determine if a match exists.

If a matching reference image is found, then at block 1112, a transformation between the current image and the matching reference image can be determined. The transformation may be derived from the feature correspondence between the images and may include a homography matrix. The transformation can be used to derive a pose difference e.g., translation and/or rotation) between a first pose of the imaging device used to capture the matching reference image and a second pose of the imaging device used to capture the current image.

At block 1114, a current position of a target location can be determined based on the transformation. For example, the pose difference of the imaging device between the current image and the reference image can be applied to the pose of the imaging device for the reference image relative to the target location (as indicated by the metadata associated with the reference image) to derive a pose of the current image relative to the target location. The pose of the current image can include a current position and/or a current orientation. Similarly, the current position and/or orientation of the target position relative to the current position of the imaging device can be determined.

At block 1116, the UAV can be controlled to land at or near the target location based at least in part on the current position of the target location determined in block 1114. In some embodiments, such as discussed in FIG. 7, current position of the target location is determined in a coordinate system that is different from the coordinate system used for recording positions of the reference images. For instance, one or more control coir commands can be generated for controlling the propulsion units of the UAV to change a vertical velocity, horizontal velocity, and/or orientation of the UAV.

At block 1118, it is determined whether additional remote control commands have been received for controlling the UAV. The determination can be made periodically at a predetermined frequency. The additional remote control commands can include command for changing a vertical velocity, a horizontal velocity and/or an orientation of the UAV. If no remote control commands have been received, the vision-based landing continues at block 1116. If additional remote control commands have been received, then at block 1120, the UAV may be controlled based at least in part on the remote control commands. In an example, when the user pushes the throttle down on a remote controller during a vision-based landing, then the UAV may be controlled to descend at a vertical velocity that is the sum of the vertical velocity as indicated by the local control commands and the vertical velocity as the indicated by the remote control commands. Alternatively or additionally, the remote control commands may pause or abort some or portions of the local control commands. In an example, when the user pushes the throttle up on a remote controller or indicates a change in a yaw or a pitch of the UAV during the vision-based landing discussed herein, then the vision-based landing may be aborted as a whole or in part. In other words, the UAV may be controlled to pause, delay, or abort the vision-based landing process. Rather, the UAV may hover in place, keep landing using other methods (e.g., using position sensors), or operating according to the remote control commands (e.g., move up or change orientation).

Variations of the above embodiments are also within the scope of the disclosure. For example, more than one imaging devices may be by the UAV to capture multiple reference and/or subject images during the takeoff and/or landing phases of the UAV. The multiple imaging devices may be positioned in a certain configuration so as to maximize their collective field of view and hence maximizing the chance of matching between the reference images and the subject images. Instead of comparing one subject image with one or more reference images, multiple subject images can be compared with the one or more reference images to improve the robustness of image matching.

The systems, devices, and methods described herein can be applied to a wide variety of movable objects. As previously mentioned, any description herein of an aerial vehicle, such as a UAV, may apply to and be used for any movable object. Any description herein of an aerial vehicle may apply specifically to UAVs. A movable object of the present disclosure can be configured to move within any suitable environment, such as in air (e.g., a fixed-wing aircraft, a rotary-wing aircraft, or an aircraft having neither fixed wings nor rotary wings), in water (e.g., a ship or a submarine), on ground (e.g., a motor vehicle, such as a car, truck, bus, van, motorcycle, bicycle; a movable structure or frame such as a stick, fishing pole; or a train), under the ground (e.g., a subway), in space (e.g., a spaceplane, a satellite, or a probe), or any combination of these environments. The movable object can be a vehicle, such as a vehicle described elsewhere herein. In some embodiments, the movable object can be carded by a living subject, or take off from a living subject, such as a human or an animal. Suitable animals can include avines, canines, felines, equines, bovines, ovines, porcines, delphines, rodents, or insects.

The movable object may be capable of moving freely within the environment with respect to six degrees of freedom (e.g., three degrees of freedom in translation and three degrees of freedom in rotation). Alternatively, the movement of the movable object can be constrained with respect to one or more degrees of freedom, such as by a predetermined path, track, or orientation. The movement can be actuated by any suitable actuation mechanism, such as an engine or a motor. The actuation mechanism of the movable object can be powered by any suitable energy source, such as electrical energy, magnetic energy, solar energy, wind energy, gravitational energy, chemical energy, nuclear energy, or any suitable combination thereof. The movable object may be self-propelled via a propulsion system, as described elsewhere herein. The propulsion system may optionally run on an energy source, such as electrical energy, magnetic energy, solar energy, wind energy, gravitational energy, chemical energy, nuclear energy, or any suitable combination thereof. Alternatively, the movable object may be carried by a living being.

In some instances, the movable object can be an aerial vehicle. For example, aerial vehicles may be fixed-wing aircraft (e.g., airplane, gliders), rotary-wing aircraft (e.g., helicopters, rotorcraft), aircraft having both fixed wings and rotary wings, or aircraft having neither (e.g., blimps, hot air balloons). An aerial vehicle can be self-propelled, such as self-propelled through the air. A self-propelled aerial vehicle can utilize a propulsion system, such as a propulsion system including one or more engines, motors, wheels, axles, magnets, rotors, propellers, blades, nozzles, or any suitable combination thereof. In some instances, the propulsion system can be used to enable the movable object to take off from a surface, land on a surface, maintain its current position and/or orientation (e.g., hover), change orientation, and/or change position.

The movable object can be controlled remotely by a user or controlled locally by an occupant within or on the movable object. The movable object may be controlled remotely via an occupant within a separate vehicle. In some embodiments, the movable object is an unmanned movable object, such as a UAV. An unmanned movable object, such as a UAV, may not have an occupant onboard the movable object. The movable object can be controlled by a human or an autonomous control system (e.g., a computer control system), or any suitable combination thereof. The movable object can be an autonomous or semi-autonomous robot, such as a robot configured with an artificial intelligence.

The movable object can have any suitable size and/or dimensions. In some embodiments, the movable object may be of a size and/or dimensions to have a human occupant within or on the vehicle. Alternatively, the movable object may be of size and/or dimensions smaller than that capable of having a human occupant within or on the vehicle. The movable object may be of a size and/or dimensions suitable for being lifted or carried by a human. Alternatively, the movable object may be larger than a size and/or dimensions suitable for being lifted or carried by a human. In some instances, the movable object may have a maximum dimension (e.g., length, width, height, diameter, diagonal) of less than or equal to about: 2 cm, 5 cm, 10 cm, 50 cm, 1 m, 2 in, 5 m, or 10 m. The maximum dimension may be greater than or equal to about: 2 cm, 5 cm, 10 cm, 50 cm, 1 m, 2 in, 5 m, or 10 m. For example, the distance between shafts of opposite rotors of the movable object may be less than or equal to about: 2 cm, 5 cm, 10 cm, 50 cm, 1 m, 2 m, 5 m, or 10 m. Alternatively, the distance between shafts of opposite rotors may be greater than or equal to about: 2 cm, 5 cm, 10 cm, 50 cm, 1 m, 2 m, 5 m, or 10 m.

In some embodiments, the movable object may have a volume of less than 100 cm×100 cm×100 cm, less than 50 cm×50 cm×30 cm, or less than 5 cm×5 cm×3 cm. The total volume of the movable object may be less than or equal to about: 1 cm$^3$, 2 cm$^3$, 5 cm$^3$, 10 cm$^3$, 20 cm$^3$, 30 cm$^3$, 40 cm$^3$, 50 cm$^3$, 60 cm$^3$, 70 cm$^3$, 80 cm$^3$, 90 cm$^3$, 100 cm$^3$, 150 cm$^3$, 200 cm$^3$, 300 cm$^3$, 500 cm$^3$, 750 cm$^3$, 1000 cm$^3$, 5000 cm$^3$, 10,000 cm$^3$, 100,000 cm$^3$3, 1 m$^3$, or 10 m$^3$. Conversely, the total volume of the movable object may be greater than or equal to about: 1 cm$^3$, 2 cm$^3$, 5 cm$^3$, 10 cm$^3$, 20 cm$^3$, 30 cm$^3$, 40 cm$^3$, 50 cm$^3$, 60 cm$^3$, 70 cm$^3$, 80 cm$^3$, 90 cm$^3$, 100 cm$^3$, 150 cm$^3$, 200 cm$^3$, 300 cm$^3$, 500 cm$^3$, 750 cm$^3$, 1000 cm$^3$, 5000 cm$^3$, 10,000 cm$^3$, 100,000 cm$^3$, 1 m$^3$, or 10 m$^3$.

In some embodiments, the movable object may have a footprint (which may refer to the lateral cross-sectional area encompassed by the movable object) less than or equal to about: 32,000 cm$^2$, 20,000 cm$^2$, 10,000 cm$^2$, 1,000 cm$^2$, 500 cm$^2$, 100 cm$^2$, 50 cm$^2$, 10 cm$^2$, or 5 cm$^2$. Conversely, the footprint may be greater than or equal to about: 32,000 cm$^2$, 20,000 cm$^2$, 10,000 cm$^2$, 1,000 cm$^2$, 500 cm$^2$, 100 cm$^2$, 50 cm$^2$, 10 cm$^2$, or 5 cm$^2$.

In some instances, the movable object may weigh no more than 1000 kg. The weight of the movable object may be less than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, g, 4 kg, 3 kg, 2 kg, 1 kg, 0.5 kg, 0.1 kg, 0.05 kg, or 0.01 kg. Conversely, the weight may be greater than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg.

In some embodiments, a movable object may be small relative to a load carried by the movable object. The load may include a payload and/or a carrier, as described in further detail elsewhere herein. In some examples, a ratio of a movable object weight to a load weight may be greater than, less than, or equal to about 1:1. In some instances, a ratio of a movable object weight to a load weight may be greater than, less than, or equal to about 1:1. Optionally, a ratio of a carrier weight to a load weight may be greater than, less than, or equal to about 1:1. When desired, the ratio of an movable object weight to a load weight may be less than or equal to: 1:2, 1:3, 1:4, 1:5, 1:10, or even less. Conversely, the ratio of a movable object weight to a load weight can also be greater than or equal to: 2:1, 3:1, 4:1, 5:1, 10:1, or even greater.

In some embodiments, the movable object may have low energy consumption. For example, the movable object may use less than about: 5 W/h, 4 W/h, 3 W/h, 2 W/h, 1 W/h, or less. In some instances, a carrier of the movable object may have low energy consumption. For example, the carrier may use less than about: 5 W/h, 4 W/h, 3 W/h, 2 W/h, 1 W/h, or less. Optionally, a payload of the movable object may have low energy consumption, such as less than about: 5 W/h, 4 W/h, 3 W/h, 2 W/h, 1 W/h, or less.

The UAV can include a propulsion system having four rotors. Any number of rotors may be provided (e.g., one, two, three, four, five, six, or more). The rotors, rotor assemblies, or other propulsion systems of the unmanned aerial vehicle may enable the unmanned aerial vehicle to hover/maintain position, change orientation, and/or change location. The distance between shafts of opposite rotors can be any suitable length. For example, the length can be less than or equal to 2 m, or less than equal to 5 m. In some embodiments, the length can be within a range from 40 cm to 1 m, from 10 cm to 2 m, or from 5 cm to 5 m. Any description herein of a UAV may apply to a movable object, such as a movable object of a different type, and vice versa.

In some embodiments, the movable object can be configured to carry a load. The load can include one or more of passengers, cargo, equipment, instruments, and the like. The load can be provided within a housing. The housing may be separate from a housing of the movable object, or be part of a housing for a movable object. Alternatively, the load can be provided with a housing while the movable object does not have a housing. Alternatively, portions of the load or the entire load can be provided without a housing. The load can be rigidly fixed relative to the movable object. Optionally, the load can be movable relative to the movable object (e.g., translatable or rotatable relative to the movable object). The load can include a payload and/or a carrier, as described elsewhere herein.

In some embodiments, the movement of the movable object, carrier, and payload relative to a fixed reference frame (e.g., the surrounding environment) and/or to each other, can be controlled by a terminal. The terminal can be a remote control device at a location distant from the movable object, carrier, and/or payload. The terminal can be disposed on or affixed to a support platform. Alternatively, the terminal can be a handheld or wearable device. For example, the terminal can include a smartphone, tablet, laptop, computer, glasses, gloves, helmet, microphone, or suitable combinations thereof. The terminal can include a user interface, such as a keyboard, mouse, joystick, touchscreen, or display. Any suitable user input can be used to interact with the terminal, such as manually entered commands, voice control, gesture control, or position control (e.g., via a movement, location or tilt of the terminal).

The terminal can be used to control any suitable state of the movable object, carrier, and/or payload. For example, the terminal can be used to control the position and/or orientation of the movable object, carrier, and/or payload relative to a fixed reference from and/or to each other. In some embodiments, the terminal can be used to control individual elements of the movable object, carrier, and/or payload, such as the actuation assembly of the carrier, a sensor of the payload, or an emitter of the payload. The terminal can include a wireless communication device adapted to communicate with one or more of the movable object, carrier, or payload.

The terminal can include a suitable display unit for viewing information of the movable object, carrier, and/or payload. For example, the terminal can be configured to display information of the movable object, carrier, and/or payload with respect to position, translational velocity, translational acceleration, orientation, angular velocity, angular acceleration, or any suitable combinations thereof. In some embodiments, the terminal can display information provided by the payload, such as data provided by a functional payload (e.g., images recorded by a camera or other image capturing device).

Optionally, the same terminal may both control the movable object, carrier, and/or payload, or a state of the movable object, carrier and/or payload, as well as receive and/or display information from the movable object, carrier and/or payload. For example, a terminal may control the positioning of the payload relative to an environment, while displaying image data captured by the payload, or information about the position of the payload. Alternatively, different terminals may be used for different functions. For example, a first terminal may control movement or a state of the movable object, carrier, and/or payload while a second terminal may receive and/or display information from the movable object, carrier, and/or payload. For example, a first terminal may be used to control the positioning of the payload relative to an environment while a second terminal displays image data captured by the payload. Various communication modes may be utilized between a movable object and an integrated terminal that both controls the movable object and receives data, or between the movable object and multiple terminals that both control the movable object and receives data. For example, at least two different communication modes may be formed between the movable object and the terminal that both controls the movable object and receives data from the movable object.

Figure 12:
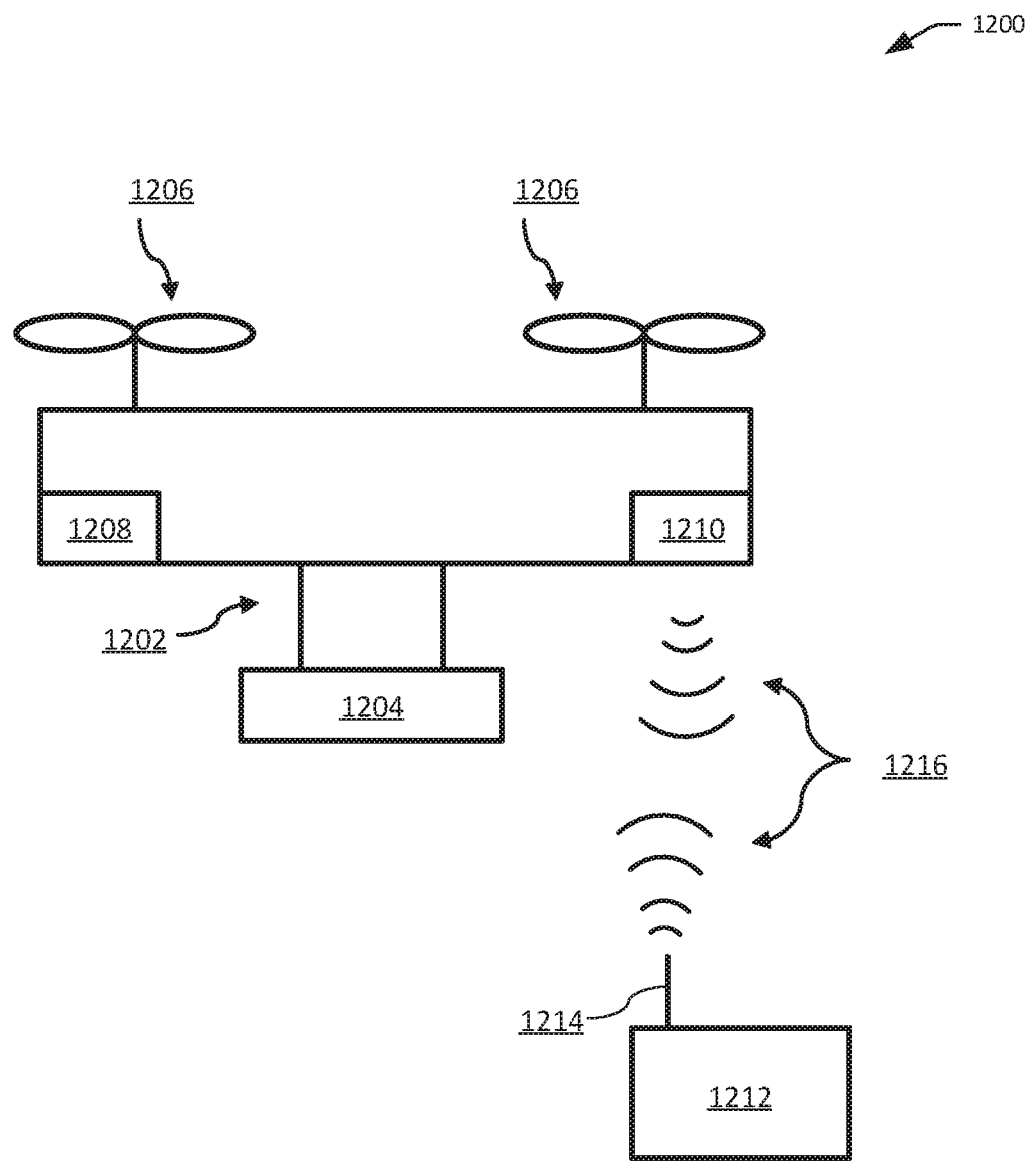
FIG. 12 illustrates a movable object including a carrier and a payload, in accordance with embodiments.

FIG. 12 illustrates a movable object 1200 including a carrier 1202 and a payload 1204, in accordance with embodiments. Although the movable object 1200 is depicted as an aircraft, this depiction is not intended to be limiting, and any suitable type of movable object can be used, as previously described herein. One of skill in the art would appreciate that any of the embodiments described herein in the context of aircraft systems can be applied to any suitable movable object (e.g., an UAV). In some instances, the payload 1204 may be provided on the movable object 1200 without requiring the carrier 1202. The movable object 1200 may include propulsion mechanisms 1206, a sensing system 1208, and a communication system 1210.

The propulsion mechanisms 1206 can include one or more of rotors, propellers, blades, engines, motors, wheels, axles, magnets, or nozzles, as previously described. The movable object may have one or more, two or more, three or more, or four or more propulsion mechanisms. The propulsion mechanisms may all be of the same type. Alternatively, one or more propulsion mechanisms can be different types of propulsion mechanisms. The propulsion mechanisms 1206 can be mounted on the movable object 1200 using any suitable means, such as a support element (e.g., a drive shaft) as described elsewhere herein. The propulsion mechanisms 1206 can be mounted on any suitable portion of the movable object 1200, such on the top, bottom, front, back, sides, or suitable combinations thereof.

In some embodiments, the propulsion mechanisms 1206 can enable the movable object 1200 to take off vertically from a surface or land vertically on a surface without requiring any horizontal movement of the movable object 1200 (e.g., without traveling down a runway). Optionally, the propulsion mechanisms 1206 can be operable to permit the movable object 1200 to hover in the air at a specified position and/or orientation. One or more of the propulsion mechanisms 1200 may be controlled independently of the other propulsion mechanisms. Alternatively, the propulsion mechanisms 1200 can be configured to be controlled simultaneously. For example, the movable object 1200 can have multiple horizontally oriented rotors that can provide lift and/or thrust to the movable object. The multiple horizontally oriented rotors can be actuated to provide vertical takeoff, vertical landing, and hovering capabilities to the movable object 1200. In some embodiments, one or more of the horizontally oriented rotors may spin in a clockwise direction, while one or more of the horizontally rotors may spin in a counterclockwise direction. For example, the number of clockwise rotors may be equal to the number of counterclockwise rotors. The rotation rate of each of the horizontally oriented rotors can be varied independently in order to control the lift and/or thrust produced by each rotor, and thereby adjust the spatial disposition, velocity, and/or acceleration of the movable object 1200 (e.g., with respect to up to three degrees of translation and up to three degrees of rotation).

The sensing system 1208 can include one or more sensors that may sense the spatial disposition, velocity, and/or acceleration of the movable object 1200 (e.g., with respect to up to three degrees of translation and up to three degrees of rotation). The one or more sensors can include global positioning system (GPS) sensors, motion sensors, inertial sensors, proximity sensors, or image sensors. The sensing data provided by the sensing system 1208 can be used to control the spatial disposition, velocity, and/or orientation of the movable object 1200 (e.g., using a suitable processing unit and/or control module, as described below). Alternatively, the sensing system 1208 can be used to provide data regarding the environment surrounding the movable object, such as weather conditions, proximity to potential obstacles, location of geographical features, location of manmade structures, and the like.

The communication system 1210 enables communication with terminal 1212 having a communication system 1214 via wireless signals 1216. The communication systems 1210, 1214 may include any number of transmitters, receivers, and/or transceivers suitable for wireless communication. The communication may be one-way communication; such that data can be transmitted in only one direction. For example, one-way communication may involve only the movable object 1200 transmitting data to the terminal 1212, or vice-versa. The data may be transmitted from one or more transmitters of the communication system 1210 to one or more receivers of the communication system 1212, or vice-versa. Alternatively, the communication may be two-way communication, such that data can be transmitted in both directions between the movable object 1200 and the terminal 1212. The two-way communication can involve transmitting data from one or more transmitters of the communication system 1210 to one or more receivers of the communication system 1214, and vice-versa.

In some embodiments, the terminal 1212 can provide control data to one or more of the movable object 1200, carrier 1202, and payload 1204 and receive information from one or more of the movable object 1200, carrier 1202, and payload 1204 (position and/or motion information of the movable object, carrier or payload; data sensed by the payload such as image data captured by a payload camera). In some instances, control data from the terminal may include instructions for relative positions, movements, actuations, or controls of the movable object, carrier and/or payload. For example, the control data may result in a modification of the location and/or orientation of the movable object (e.g., via control of the propulsion mechanisms 1206), or a movement of the payload with respect to the movable object (e.g., via control of the carrier 1202). The control data from the terminal may result in control of the payload, such as control of the operation of a camera or other image capturing device (e.g., taking still or moving pictures, zooming in or out, turning on or off, switching imaging modes, change image resolution, changing focus, changing depth of field, changing exposure time, changing viewing angle or field of view). In some instances, the communications from the movable object, carrier and/or payload may include information from one or more sensors (e.g., of the sensing system 1208 or of the payload 1204). The communications may include sensed information from one or more different types of sensors (e.g., GPS sensors, motion sensors, inertial sensor, proximity sensors, or image sensors). Such information may pertain to the position (e.g., location, orientation), movement, or acceleration of the movable object, carrier and/or payload. Such information from a payload may include data captured by the payload or a sensed state of the payload. The control data provided transmitted by the terminal 1212 can be configured to control a state of one or more of the movable object 1200, carrier 1202, or payload 1204. Alternatively or in combination, the carrier 1202 and payload 1204 can also each include a communication module configured to communicate with terminal 1212, such that the terminal can communicate with and control each of the movable object 1200, carrier 1202, and payload 1204 independently.

In some embodiments, the movable object 1200 can be configured to communicate with another remote device in addition to the terminal 1212, or instead of the terminal 1212. The terminal 1212 may also be configured to communicate with another remote device as well as the movable object 1200. For example, the movable object 1200 and/or terminal 1212 may communicate with another movable object, or a carrier or payload of another movable object. When desired, the remote device may be a second terminal or other computing device (e.g., computer, laptop, tablet, smartphone, or other mobile device). The remote device can be configured to transmit data to the movable object 1200, receive data from the movable object 1200, transmit data to the terminal 1212, and/or receive data from the terminal 1212. Optionally, the remote device can be connected to the Internet or other telecommunications network, such that data received from the movable object 1200 and/or terminal 1212 can be uploaded to a website or server.

Figure 13:
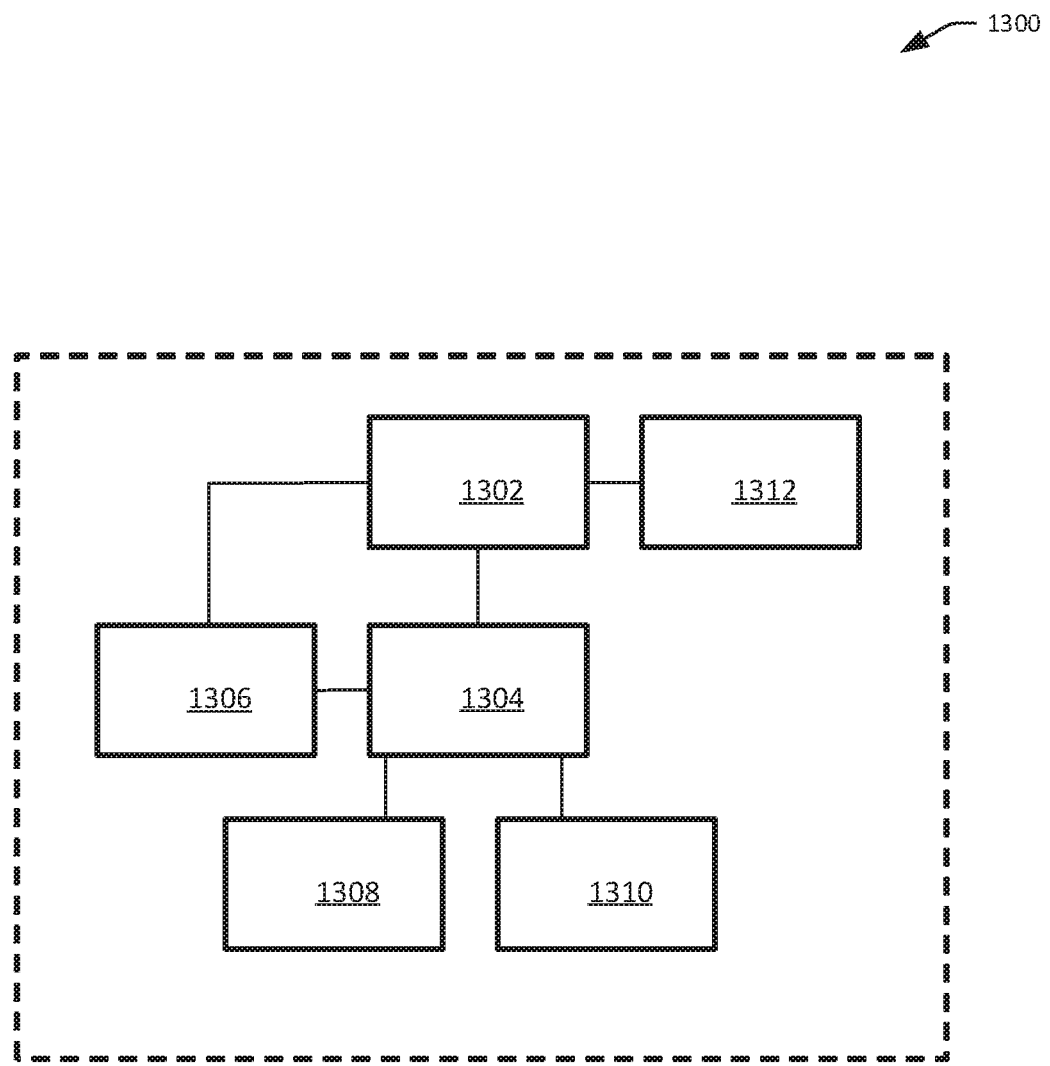
FIG. 13 is a schematic illustration by way of block diagram of a system for controlling a movable object, in accordance with embodiments.

FIG. 13 is a schematic illustration by way of block diagram of a system 1300 for controlling a movable object, in accordance with embodiments. The system 1300 can be used in combination with any suitable embodiment of the systems, devices, and methods disclosed herein. The system 1300 can include a sensing module 1302, processing unit 1304, non-transitory computer readable medium 1306, control module 1308, and communication module 1310.

The sensing module 1302 can utilize different types of sensors that collect information relating to the movable objects in different ways. Different types of sensors may sense different types of signals or signals from different sources. For example, the sensors can include inertial sensors, GPS sensors, proximity sensors (e.g., lidar), or vision/image sensors (e.g., a camera). The sensing module 1302 can be operatively coupled to a processing unit 1304 having a plurality of processors. In some embodiments, the sensing module can be operatively coupled to a transmission module 1312 (e.g., a Wi-Fi image transmission module) configured to directly transmit sensing data to a suitable external device or system. For example, the transmission module 1312 can be used to transmit images captured by a camera of the sensing module 1302 to a remote terminal.

The processing unit 1304 can have one or more processors, such as a programmable processor (e.g., a central processing unit (CPU)). The processing unit 1304 can be operatively coupled to a non-transitory computer readable medium 1306. The non-transitory computer readable medium 1306 can store logic, code, and/or program instructions executable by the processing unit 1304 for performing one or more steps. The non-transitory computer readable medium can include one or more memory units (e.g., removable media or external storage such as an SD card or random access memory (RAM)). In some embodiments, data from the sensing module 1302 can be directly conveyed to and stored within the memory units of the non-transitory computer readable medium 1306. The memory units of the non-transitory computer readable medium 1306 can store logic, code and/or program instructions executable by the processing unit 1304 to perform any suitable embodiment of the methods described herein. The memory units can store sensing data from the sensing module to be processed by the processing unit 1304. In some embodiments, the memory units of the non-transitory computer readable medium 1306 can be used to store the processing results produced by the processing unit 1304.

In some embodiments, the processing unit 1304 can be operatively coupled to a control module 1308 configured to control a state of the movable object. For example, the control module 1308 can be configured to control the propulsion mechanisms of the movable object to adjust the spatial disposition, velocity, and/or acceleration of the movable object with respect to six degrees of freedom. Alternatively or in combination, the control module 1308 can control one or more of a state of a carrier, payload, or sensing module.

The processing unit 1304 can be operatively coupled to a communication module 1310 configured to transmit and/or receive data from one or more external devices (e.g., a terminal, display device, or other remote controller). Any suitable means of communication can be used, such as wired communication or wireless communication. For example, the communication module 1310 can utilize one or more of local area networks (LAN), wide area networks (WAN), infrared, radio, WiFi, point-to-point (P2P) networks, telecommunication networks, cloud communication, and the like. Optionally, relay stations, such as towers, satellites, or mobile stations, can be used. Wireless communications can be proximity dependent or proximity independent. In some embodiments, line-of-sight may or may not be required for communications. The communication module 1310 can transmit and/or receive one or more of sensing data from the sensing module 1302, processing results produced by the processing unit 1304, predetermined control data, user commands from a terminal or remote controller, and the like.

The components of the system 1300 can be arranged in any suitable configuration. For example, one or more of the components of the system 1300 can be located on the movable object, carrier, payload, terminal, sensing system or an additional external device in communication with one or more of the above. Additionally, although FIG. 13 depicts a single processing unit 1304 and a single non-transitory computer readable medium 1306, one of skill in the art would appreciate that this is not intended to be limiting, and that the system 1300 can include a plurality of processing units and/or non-transitory computer readable media. In some embodiments, one or more of the plurality of processing units and/or non-transitory computer readable media can be situated at different locations, such as on the movable object, carrier, payload, terminal, sensing module, additional external device in communication with one or more of the above, or suitable combinations thereof, such that any suitable aspect of the processing and/or memory functions performed by the system 1300 can occur at one or more of the aforementioned locations.

While some embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure. It is intended that the following claims define the scope of the invention and that methods and structures within the scope of these claims and their equivalents be covered thereby.

What is claimed is:

1. A computer-implemented method for controlling an unmanned aerial vehicle (UAV), comprising:
obtaining a plurality of first images captured by an imaging device carried by the UAV during a takeoff of the UAV from a target location, the plurality of first images being captured with a spatial or temporal interval dynamically determined based in part on an environment surrounding the UAV including terrain information surrounding the UAV;
in response to an indication to return to the target location, obtaining a second image from the imaging device;
determining a spatial relationship between the UAV and the target location by comparing the second image and a corresponding one of the plurality of first images; and
controlling the UAV to approach the target location based at least in part on the spatial relationship.

2. The method of claim 1, wherein the plurality of first images and the second image are obtained during a same flight of the UAV.

3. The method of claim 1, wherein the corresponding one of the plurality of first images or the second image does not include the target location.

4. The method of claim 1, wherein the indication to return to the target location is received from a remote device or generated by one or more processors onboard the UAV.

5. The method of claim 1, wherein the corresponding one of the plurality of first images is captured at a first pose and the second image is captured at a second pose, and wherein determining the spatial relationship between the UAV and the target location comprises:
determining a transformation between the first pose and the second pose based on the comparison between the second image and the corresponding one of the plurality of first images; and
determining the second pose based at least in part on the first pose and the transformation.

6. The method of claim 5, wherein the first pose comprises a position or an orientation of the UAV when the corresponding one of the plurality of first images is captured.

7. The method of claim 5, wherein the first pose comprises a position or an orientation of the imaging device when the corresponding one of the plurality of first images is captured.

8. The method of claim 5, wherein the corresponding one of the plurality of first images is captured at a first orientation of the imaging device, and wherein the method further comprises causing the imaging device to have substantially the first orientation before the second image is captured.

9. The method of claim 5, wherein:
the first pose is determined based at least in part on a measurement from a non-vision position sensor; and
the second pose is determined without using the measurement from the non-vision position sensor.

10. The method of claim 1, wherein:
the imaging device is controlled to face a non-downward direction during an initial takeoff and is controlled to rotate towards a downward direction in response to the UAV ascending during the takeoff of the UAV; and
the imaging device is controlled to face the downward direction during an initial return and is controlled to rotate towards the non-downward direction in response to the UAV descending during the return of the UAV.

11. The method of claim 1, wherein the spatial or temporal interval is dynamically determined based further in part on at least one of:
a state of the UAV including at least one of an altitude, a processing power, a battery life, or an available storage space of the UAV, or
a state of the imaging device including at least one of an altitude, a processing power, a battery life, or an available storage space of the imaging device.

12. An unmanned aerial vehicle (UAV), comprising:
a memory that stores one or more computer-executable instructions; and
one or more processors configured to access the memory and execute the computer-executable instructions to perform a method comprising:
obtaining a plurality of first images captured by an imaging device carried by the UAV during a takeoff of the UAV from a target location, the plurality of first images being captured with a spatial or temporal interval dynamically determined based in part on an environment surrounding the UAV, the environment surrounding the UAV including terrain information surrounding the UAV;
in response to an indication to return to the target location, obtaining a second image from the imaging device;
determining a spatial relationship between the UAV and the target location by comparing the second image and a corresponding one of the plurality of first images; and
controlling the UAV to approach the target location based at least in part on the spatial relationship.

13. The UAV of claim 12, wherein the plurality of first images and the second image are obtained during a same flight of the UAV.

14. The UAV of claim 12, wherein the corresponding one of plurality of first images or the second image does not include the target location.

15. The UAV of claim 12, wherein the indication to return to the target location is received from a remote device or generated by one or more processors onboard the UAV.

16. The UAV of claim 12, wherein the corresponding one of the plurality of first images is captured at a first pose and the second image is captured at a second pose, and wherein determining the spatial relationship between the UAV and the target location comprises:
determining a transformation between the first pose and the second pose based on the comparison between the second image and the corresponding one of the plurality of first images; and
determining the second pose based at least in part on the first pose and the transformation.

17. The UAV of claim 16, wherein the first pose comprises a position or an orientation of the UAV when the corresponding one of the plurality of first images is captured.

18. The UAV of claim 16, wherein the first pose comprises a position or an orientation of the imaging device when the corresponding one of the plurality of first images is captured.

19. A computer-implemented method for determining a position of an unmanned aerial vehicle (UAV), comprising:
determining a plurality of first positions of the UAV based at least in part on a measurement from a non-vision position sensor carried by the UAV;
associating the plurality of first positions of the UAV with a plurality of first images captured by an imaging device carried by the UAV when the UAV is at a plurality of first poses, each of the plurality of first poses including a corresponding one of the plurality of the first positions, the plurality of first images being captured with a spatial or temporal interval dynamically determined based in part on an environment surrounding the UAV, the environment surrounding the UAV including terrain information surrounding the UAV; and determining a second position of the UAV by comparing a second image with a corresponding one of the plurality of first images, the second image being captured by the imaging device when the UAV is at a second pose, the second pose including the second position and being determined without using the measurement of the non-vision position sensor.

* * * * *